(12) United States Patent
Ariu

(10) Patent No.: US 7,801,726 B2
(45) Date of Patent: Sep. 21, 2010

(54) APPARATUS, METHOD AND COMPUTER PROGRAM PRODUCT FOR SPEECH PROCESSING

(75) Inventor: Masahide Ariu, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1009 days.

(21) Appl. No.: 11/550,236

(22) Filed: Oct. 17, 2006

(65) Prior Publication Data

US 2007/0233471 A1 Oct. 4, 2007

(30) Foreign Application Priority Data

Mar. 29, 2006 (JP) ............................. 2006-091995

(51) Int. Cl.
*G10L 15/06* (2006.01)
(52) U.S. Cl. ...................... 704/243; 704/211; 704/208; 704/248; 704/233
(58) Field of Classification Search ................. 704/233, 704/243, 251, 246, 248, 208, 211, 256.8, 704/268, 219, 270, 240
See application file for complete search history.

(56) References Cited

U.S. PATENT DOCUMENTS

| | | | | |
|---|---|---|---|---|
| 4,535,473 | A | * | 8/1985 | Sakata .......................... 704/248 |
| 5,857,173 | A | * | 1/1999 | Beard et al. ................... 704/276 |
| 5,884,257 | A | * | 3/1999 | Maekawa et al. ............. 704/248 |
| 5,983,186 | A | * | 11/1999 | Miyazawa et al. ........... 704/275 |
| 6,041,227 | A | * | 3/2000 | Sumner .................... 455/412.2 |
| 6,067,516 | A | * | 5/2000 | Levay et al. .................. 704/244 |
| 6,131,044 | A | * | 10/2000 | Ryu ............................. 455/563 |
| 6,154,721 | A | * | 11/2000 | Sonnic ......................... 704/233 |
| 6,167,374 | A | * | 12/2000 | Shaffer et al. ................ 704/227 |
| 6,233,557 | B1 | * | 5/2001 | Poppert ....................... 704/250 |
| 6,418,412 | B1 | * | 7/2002 | Asghar et al. ............. 704/256.5 |
| 6,471,420 | B1 | * | 10/2002 | Maekawa et al. ........... 704/250 |

FOREIGN PATENT DOCUMENTS

| | | |
|---|---|---|
| JP | 59-121099 | 7/1984 |
| JP | 8-185196 | 7/1996 |
| JP | 8-339198 | 12/1996 |
| JP | 10-171492 | 6/1998 |
| JP | 11-338490 | 12/1999 |
| JP | 2000-99099 | 4/2000 |
| JP | 2001-75594 | 3/2001 |
| JP | 2003-295892 | 10/2003 |
| JP | 2004-24863 | 1/2004 |
| JP | 2004-302196 | 10/2004 |
| JP | 2005-141759 | 6/2005 |

* cited by examiner

*Primary Examiner*—Vijay B Chawan
(74) *Attorney, Agent, or Firm*—Oblon, Spivak, McClelland, Maier & Neustadt, L.L.P.

(57) ABSTRACT

A speech processing apparatus includes a sound input unit that receives an input of a sound including a voice of one of an operator and a person other than the operator; a designation-duration accepting unit that accepts a designation-duration designated by the operator as a time interval that is a target of a speech processing within the input sound; a voice-duration detecting unit that detects a voice-duration that is a time interval in which the voice is present from the input sound; a speaker determining unit that determines whether a speaker of the voice is the operator or the person based on the input sound; and a deciding unit that detects an overlapping period between the designation-duration and the voice-duration, and decides that the voice-duration including the overlapping period is a processing duration, when the overlapping period is detected and the speaker is determined to be the person.

18 Claims, 18 Drawing Sheets

APPARATUS, METHOD AND COMPUTER PROGRAM PRODUCT FOR SPEECH PROCESSING

CROSS-REFERENCE TO RELATED APPLICATIONS

This application is based upon and claims the benefit of priority from the prior Japanese Patent Application No. 2006-91995, filed on Mar. 29, 2006; the entire contents of which are incorporated herein by reference.

BACKGROUND OF THE INVENTION

1. Field of the Invention

The present invention relates to an apparatus, a method, and a computer program product for speech processing.

2. Description of the Related Art

In recent years, development of a speech translation system or the like that supports an interlingual communication by translating a source language of an input voice into a target language is underway as one type of a speech processing apparatus that processes the input speech.

In the speech translation system, it is required to execute a speech processing for every speaker because speeches of a plurality of speakers are input to the system. There is a proposed technique for specifying a direction in which the speaker of each input speech is present and for deciding a translation direction by using a movable microphone or a gyrosensor as disclosed in, for example, JP-A 2005-141759 (KOKAI).

The technique disclosed in JP-A 2005-141759 (KOKAI) has, however, problems of occurrence of malfunction and complicated operation. This is because the technique is unable to perform the speech processing for every input sound if a surrounding noise or a nod such as a response from a counterpart to a speaker, which response should not be processed, is present.

With the technique disclosed in JP-A 2005-141759 (KOKAI), the speaker is switched over between an operator and a counterpart by moving a main body of the speech translation system or the microphone toward the operator or the counterpart. The switching operation is, however, disadvantageously required to be performed for every conversation and is possibly placed in the way of natural conversation. JP-A 2005-141759 (KOKAI) discloses the speaker-switching method using a microphone array; however, the problem of the possible undesired processing of unnecessary speech remains unsolved.

As the other method of determining the speaker, a technique for allowing a user to explicitly designate a speaker is disclosed in JP-A 2003-29589 (KOKAI). Specifically, the user turns on a switch when a user's speech is input, and turns off the switch to input a counterpart's speech. The technique disclosed in JP-A 2003-295892 (KOKAI) makes it possible to determine a translation language by one switch operation and can, therefore, improve operativity of the apparatus.

The method disclosed in JP-A 2003-295892 (KOKAI) has, however, the problem that an unnecessary voice is processed to cause possible occurrence of malfunction for the following reasons. With the method disclosed in JP-A 2003-295892 (KOKAI), a duration of a sound to be processed can be designated for the user's speech by turning on the switch. However, when the user turns off the switch, all input voices are processed. The problem results from absence of a method of appropriately setting a voice duration for the counterpart's speech.

SUMMARY OF THE INVENTION

According to one aspect of the present invention, a speech processing apparatus includes a sound input unit that receives an input of a sound including a voice of one of an operator and a person other than the operator; a designation-duration accepting unit that accepts a designation-duration designated by the operator as a time interval that is a target of a speech processing within the input sound; a voice-duration detecting unit that detects a voice-duration that is a time interval in which the voice is present from the input sound; a speaker determining unit that determines whether a speaker of the voice is the operator or the person other than the operator based on the input sound; and a deciding unit that detects an overlapping period between the accepted designation-duration and the detected voice-duration, and decides that the voice-duration including the overlapping period is a processing duration, when the overlapping period is detected and the speaker is determined to be the person other than the operator by the speaker determining unit.

According to another aspect of the present invention, a speech processing method includes inputting a sound including a voice of one of an operator and a person other than the operator; accepting an input of a designation-duration designated by the operator as a time interval that is a target of a speech processing within the input sound; detecting a voice-duration that is a time interval in which the voice is present from the input sound; determining whether a speaker of the voice is the operator or the person other than the operator based on the input sound; detecting an overlapping period between the received designation-duration and the detected voice-duration; and deciding that the voice-duration including the overlapping period is a processing duration, when the overlapping period is detected and the speaker is determined to be the person other than the operator.

A computer program product according to still another aspect of the present invention causes a computer to perform the method according to the present invention.

DETAILED DESCRIPTION OF THE INVENTION

Exemplary embodiments of the speech processing apparatus, speech processing method and speech processing program product according to the present invention will be explained hereinafter with reference to the accompanying drawings.

A speech processing apparatus according to a first embodiment of the present invention decides a processing duration based on a designation-duration, a voice-duration, and speaker information. The processing duration is a sound duration which is a speech processing target (hereinafter, abbreviated as "target sound"). The designation-duration is a duration designated by an operator. The voice-duration is detected from an input sound. The speaker information is obtained by referring to information on sounds input from a plurality of microphones.

Specifically, the voice-duration is a duration of a voice determined as a voice among a plurality of input sounds. The processing duration is a duration of the target sound actually processed. The designation-duration is a duration designated by the operator for the speech processing. Because the designation-duration is designated by the operator, there is a probability that the designation-duration is erroneously designated by the operator due to an operation error. In this case, the designated duration should not be regarded as the processing duration. The first embodiment can, however, appropriately decides the processing duration in view of the possible operation error or the like.

Figure 1:
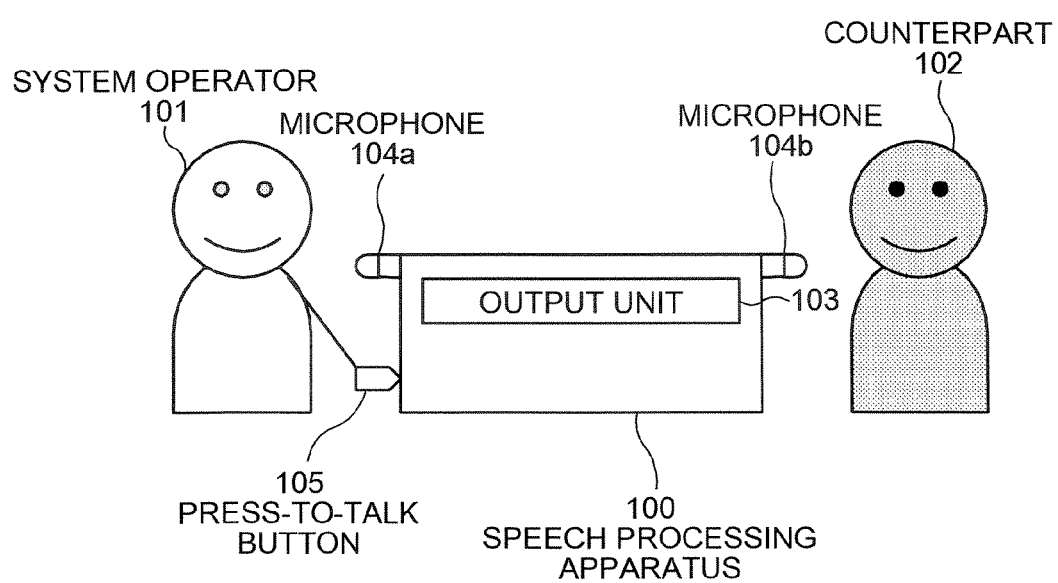
FIG. 1 is a schematic view explaining a situation of using a speech processing apparatus according to a first embodiment of the present invention.

FIG. 1 is a schematic view of a situation in which the speech processing apparatus according to the first embodiment is used.

Speakers or users to a speech processing apparatus 100 include a system operator 101 and a counterpart 102. In the first embodiment, it is assumed that a language spoken by the system operator 101 is language L1 and that spoken by the counterpart 102 is language L2.

The speech processing apparatus 100 includes, as a hardware configuration, an output unit 103, microphones 104a and 104b, and a press-to-talk button 105. The output unit 103 outputs a speech processing result to the users, i.e., the system operator 101 and the counterpart 102. The output unit 103 may use, as an output method, many kind of conventional methods such as a method of displaying the speech processing result on a display device such as a liquid crystal display or a method of outputting a speech obtained by speech-synthesizing the speech processing result.

A sound including a voice of the system operator 101 or the counterpart 102 is input to each of the microphones 104a and 104b. The microphone 104a is oriented to the system operator 101 whereas the microphone 104b is oriented to the counterpart 102. It is assumed that the relative positional relationship between the system operator 101 and the counterpart 102 is fixed.

The press-to-talk button 105 is employed by the system operator 101 to designate the designation-duration of the sound. The press-to-talk button 105 is set in two states; an ON-state in which the system operator 101 turns on the press-to-talk button 105 and an OFF-state in which the system operator 101 turns off the press-to-talk button 105. It is assumed that the system operator 101 designates a duration in which the press-to-talk button 105 is in the ON-state, i.e., an ON signal indicating the ON-state is output from the press-to-talk button 105 as the designation-duration.

Figure 2:
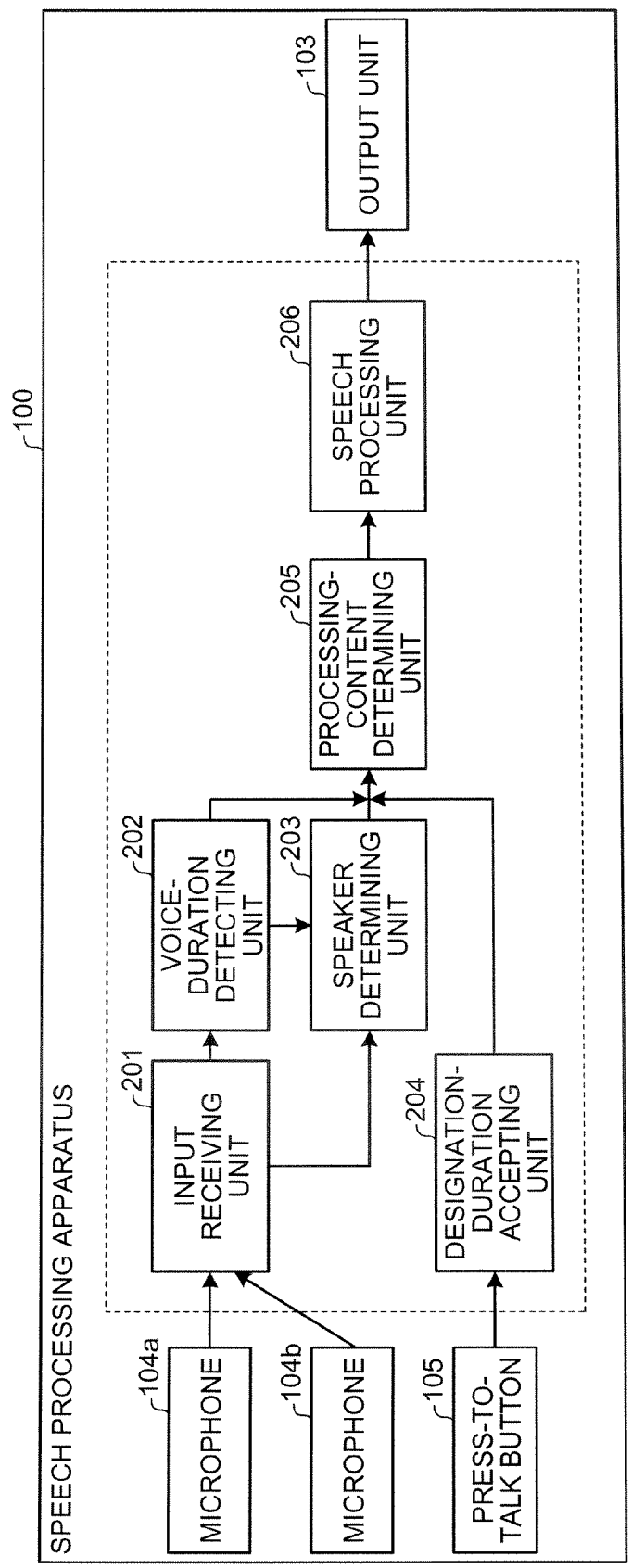
FIG. 2 is a functional block diagram of the speech processing apparatus according to the first embodiment.

FIG. 2 is a block diagram of the speech processing apparatus 100 according to the first embodiment. As explained with reference to FIG. 1, the speech processing apparatus 100 includes, as the hardware configuration, the output unit 103, the microphones 104a and 104b, and the press-to-talk button 105. As shown in FIG. 2, the speech processing apparatus 100 also includes, as a software configuration, an input receiving unit 201, a voice-duration detecting unit 202, a speaker determining unit 203, a designation-duration accepting unit 204, a processing-content determining unit 205, and a speech processing unit 206.

The input receiving unit 201 receives the sound including the voice of the system operator 101 or the counterpart 102. Specifically, the input receiving unit 201 samples analog signal of the sound output from the two respective microphones 104a and 104b, and converts the analog signal into a stereo digital signal. The input receiving unit 201 outputs the stereo digital signal to the voice-duration detecting unit 202 and the speaker determining unit 203. The input receiving unit 201 can perform the processing using a conventional A/D conversion technique or the like.

The voice-duration detecting unit 202 detects the voice-duration from the stereo digital signal output from the input receiving unit 201. The voice-duration detecting unit 202 can detect the voice-duration using any one of conventional voice-duration detecting techniques. Examples of the conventional detecting techniques include a method of determining a duration relatively longer than a threshold having a preset volume as the voice-duration and a method of determining a duration having a high likelihood of a voice model obtained by performing a frequency analysis on a sound as the voice-duration.

The speaker determining unit 203 determines whether the speaker of the voice is the system operator 101 or the counterpart 102 from the stereo digital signal output from the input receiving unit 201.

The speaker determining unit 203 can determine whether the speaker is the system operator 101 or the counterpart 102 using any one of conventional methods. Examples of the conventional determining methods include a method based on a loudness of the sound input to each of the microphones 104a and 104b using the signals output from the microphones 104a and 104b, and a method based on plus or minus of a time difference represented by a cross-correlation function.

The designation-duration accepting unit 204 accepts the duration designated by the system operator 101. Specifically, the press-to-talk button 105 transmits the ON signal to the designation-duration accepting unit 204 when the press-to-talk button 105 is in the ON state, and transmits an OFF signal to the designation-duration accepting unit 204 when the press-to-talk button 105 is in the OFF state. When the designation-duration accepting unit 204 receives the ON signal, the designation-duration accepting unit 204 accepts the duration in which the ON signal is input to the designation-duration accepting unit 204 as the designation-duration.

The processing-content determining unit 205 judges the processing duration in which the speech processing unit 206 performs a speech processing on the sound input to the input receiving unit 201 and a content of the speech processing, while referring to information on the voice-duration detected by the voice-duration detecting unit 202, information on the speaker determined by the speaker determining unit 203, and information on the designation-duration accepted by the designation-duration accepting unit 204. In the first embodiment, the processing-content determining unit 205 decides, as the content of the speech processing, whether speech recognition and translation are performed using the language L1 or the language L2.

The speech processing unit 206 performs the speech processing, the content of which is decided by the processing-content determining unit 205, on the processing duration decided by the processing-content determining unit 205. The speech processing unit 206 performs a speech recognition processing and a translation processing on the sound in the processing duration among the input sound, and outputs a result of the speech recognition processing and that of the translation processing to the output unit 103.

In the speech recognition processing, the speech processing unit 206 can use any one of well-known speech recognizing methods such as methods using linear prediction coding (LPC) analysis, a hidden Markov model (HMM), dynamic programming, a neural network, and an N-gram language model.

In the translation processing, the speech processing unit 206 can use any one of well-known machine translation methods such as a syntactic-transfer-based machine translation, an example-based machine translation, a statistical machine translation, and an intermediate-language machine translation.

The speech processing performed by the speech processing apparatus 100 according to the first embodiment will be explained.

In the speech processing, the processing-content determining unit 205 decides the processing duration and the processing-content based on processing results output from the voice-duration detecting unit 202, the speaker determining unit 203, and the designation-duration accepting unit 204 for every predetermined time unit (hereinafter, abbreviated as "frame"). In addition, the speech processing unit 206 performs the speech processing on the sound.

Predetermined periods of time are often required to perform the voice-duration detection processing, the speaker determination processing, and the designation-duration acceptance processing, respectively. For this reason, the speech processing is actually delayed by as much as the number of frames corresponding to the longest time duration among those for the voice-duration detection processing, the speaker determination processing, and the designation-duration acceptance processing. However, for convenience sake, it is assumed that the speech processing is performed without such delay.

For instance, the speaker produces a voice at a time t. It takes Δt seconds to determine that the voice starts at the time t. However, even if an actual time is t+Δt, the apparatus can regard the time t as a start of detection of the voice. Such a processing method is well known to instances of dealing with real-time signals such as the speech recognition, and can be realized by a conventional technique.

Moreover, the voice-duration detecting unit 202, the speaker determining unit 203, the designation-duration accepting unit 204, the processing-content determining unit 205, and the speech processing unit 206 perform their respective processings for every frame, and output the processing results. The processing results can be output after the voice-duration detecting unit 202 or the designation-duration accepting unit 204 obtains a start and an end of each duration.

Figure 3:
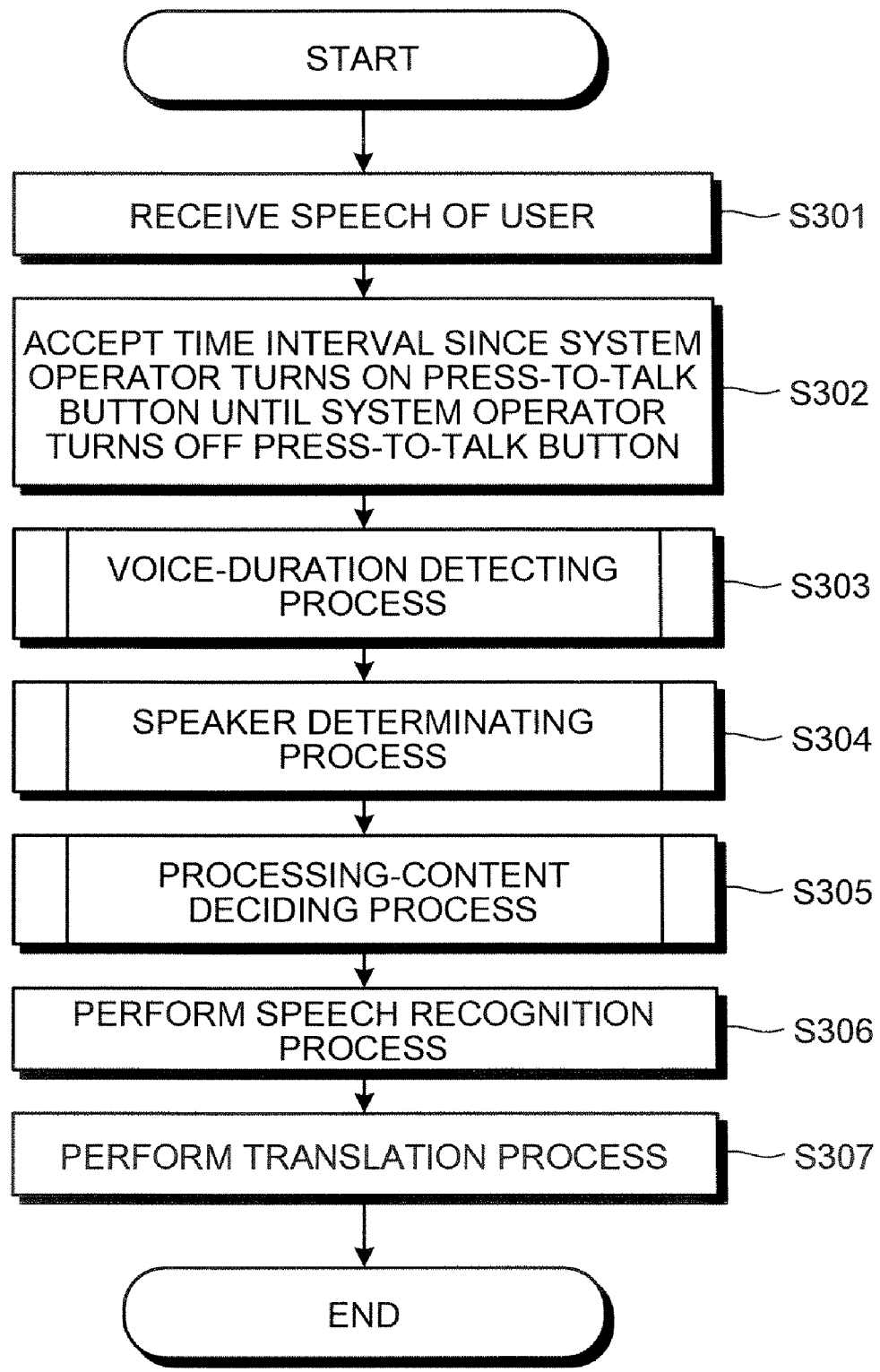
FIG. 3 is a flowchart of a speech processing according to the first embodiment.

An overall flow of the speech processing according to the first embodiment will be explained. FIG. 3 is a flowchart of the overall flow of the speech processing according to the first embodiment.

First of all, in each frame, the input receiving unit 201 receives a sound produced by one of the users (the system operator 101 or the counterpart 102) (step S301). Specifically, the input receiving unit 201 converts the sound analog signal output from the microphone 104*a* or 104*b* into a digital signal and outputs a processing result by as much as the frame.

The designation-duration accepting unit 204 accepts time interval since the system operator 101 turns on the press-to-talk button 105 until the system operator 101 turns off the press-to-talk button 105 as the designation-duration (step S302). Specifically, the designation-duration accepting unit 204 determines whether the system operator 101 depresses the press-to-talk button 105 in each frame, and accepts the interval from start of depression until end of depression as the designation-duration.

Next, the voice-duration detecting unit 202 performs the voice-duration detection processing (step S303), the speaker determining unit 203 performs the speaker determination processing (step S304), and the processing-content determining unit 205 performs the processing-content judging process (step S305). The voice-duration detection processing, the speaker determination processing, and the processing-content judging processing will be explained later in detail.

Then, the speech processing unit 206 performs the speech recognition processing on the sound in the processing duration according to the result of the processing-content judging process (step S306).

In the first embodiment, the speech processing unit 206 starts the speech processing just after the processing-content and the processing duration are determined by the processing-content judging processing. Alternatively, the speech processing can be performed after the processing-content and the processing duration are determined and then detection of both the voice-duration and the designation-duration is completed.

Specifically, the speech recognition processing at the step S306 is executed as follows. First, the speech processing unit 206 acquires sound information corresponding to the processing duration from a storage region (not shown) such as a random access memory (RAM). At the time of acquisition of the sound information, the speaker determining unit 203 already determines whether the speaker is the system operator 101 or the counterpart 102. Therefore, if the speaker is the system operator 101, the speech processing unit 206 acquires the sound information corresponding to the processing duration for the sound gathered by the microphone 104*a*. If the speaker is the counterpart 102, the speech processing unit 206 acquires the sound information corresponding to the processing duration for the sound gathered by the microphone 104*b*.

After acquiring the sound information, the speech processing unit 206 performs the speech recognition processing on the acquired sound using the language designated in the processing-content. If the speaker is the system operator 101, the language L1 is set in the processing-content, and if the speaker is the counterpart 102, the language L2 is set in the processing-content by the processing-content judging process of the processing-content determining unit 205. The speech processing unit 206 performs the speech recognition processing on the acquired sound according to the processing-content.

Because of difference in languages according to whether the speaker is the system operator 101 or the counterpart 102, the speech processing unit 206 performs the speech recognition processing while changing information such as an acoustic model, a vocabulary, and grammars used in the speech recognition processing.

The speech processing unit 206 performs the translation processing on the sound in the processing duration according to a result of the speech recognition processing (step S307).

Specifically, the speech processing unit 206 translates the speech recognition processing result from a certain language into the language set in the processing-content. For instance, the processing-content determining unit 205 sets the following processing-content by the processing-content judging process. If the speaker is the system operator 101, the speech processing unit 206 translates the speech recognition processing result from the language L1 into the language L2. If the speaker is the counterpart 102, the speech processing unit 206 translates the speech recognition processing result from the language L2 into the language L1. The speech processing unit 206 translates the speech recognition processing result according to the processing-content.

Alternatively, not only the source language and the translation language but also a translating method can be changed according to whether the speaker is the system operator 101 or the counterpart 102.

Figure 4:
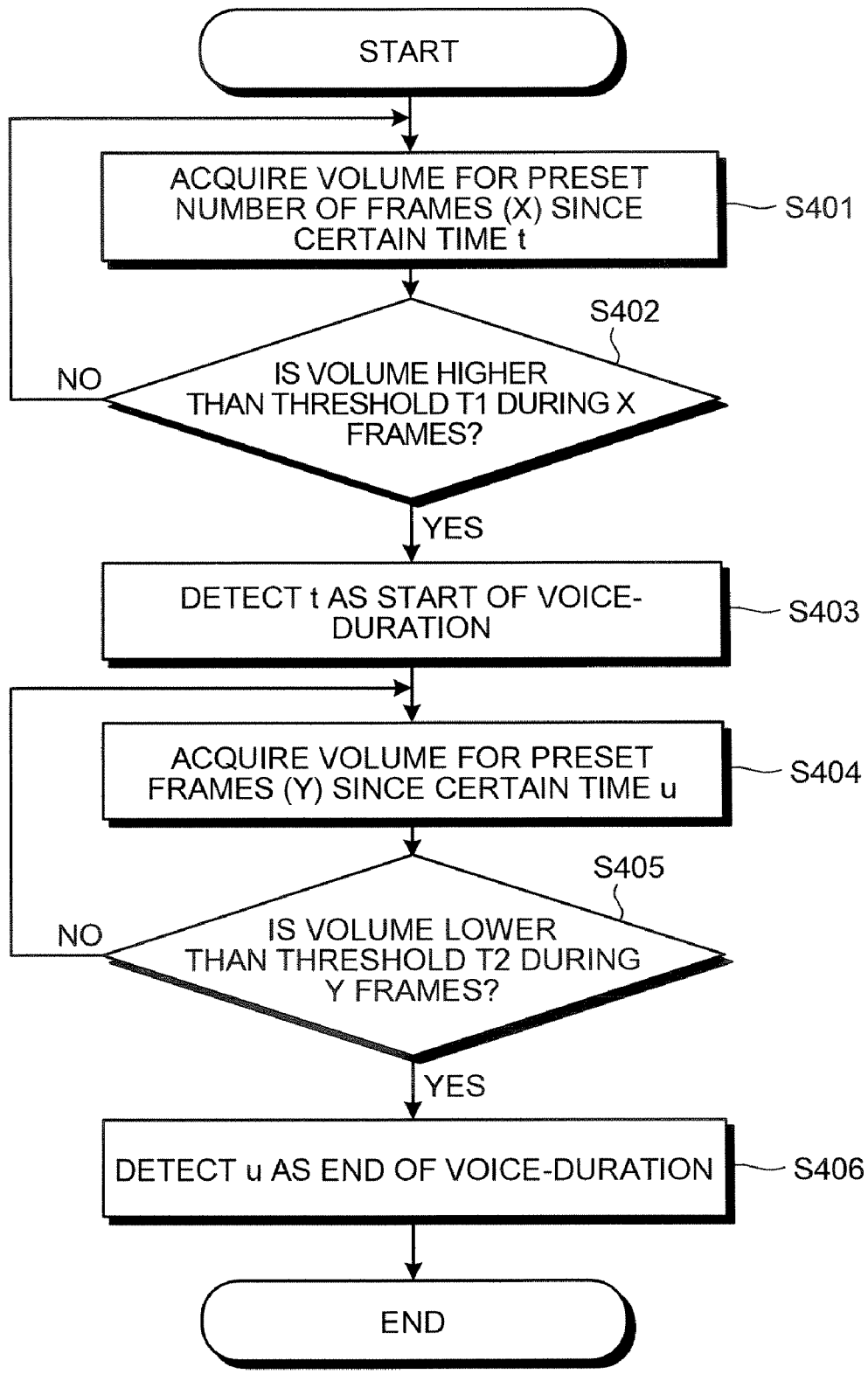
FIG. 4 is a flowchart of a voice-duration detection processing according to the first embodiment.

The voice-duration detection processing at the step S303 will next be explained in detail. FIG. 4 is a flowchart of an overall flow of the voice-duration detection processing according to the first embodiment.

First, the voice-duration detecting unit 202 acquires a volume per frame for a preset number of frames (hereinafter, abbreviated as "X") since the time t (step S401). The volume per frame can be calculated using the digital signal input from the input receiving unit 201. The voice-duration detecting unit 202 determines whether the volume per frame is higher than a predetermined threshold (hereinafter, "threshold T1") during the X frames (step S402). If the volume per frame is not higher than the threshold T1 (step S402: NO), the flow returns to the step S401 and repeats the processing.

If the volume per frame is higher than the threshold T1 (step S402: YES), the voice-duration detecting unit 202 detects the time t as a start of the voice-duration (step S403).

Next, the voice-duration detecting unit 202 acquires a volume per a preset number of frames (hereinafter, abbreviated as "Y") since a certain time u (step S404).

The voice-duration detecting unit 202 determines whether the volume per frame is lower than a predetermined threshold (hereinafter, "threshold T2") during Y frames (step S405). If the volume per frame is not lower than the threshold T2 (step S405: NO), the flow returns to the step S404 and repeatedly performs the processing. If the volume per frame is lower than the threshold T2 (step S405: YES), the voice-duration detecting unit 202 detects the time u as an end of the voice-duration (step S406). In this manner, the voice-duration detecting unit 202 detects the duration from the detected start of the voice-duration to the detected end of the voice as the voice-duration.

Figure 5:
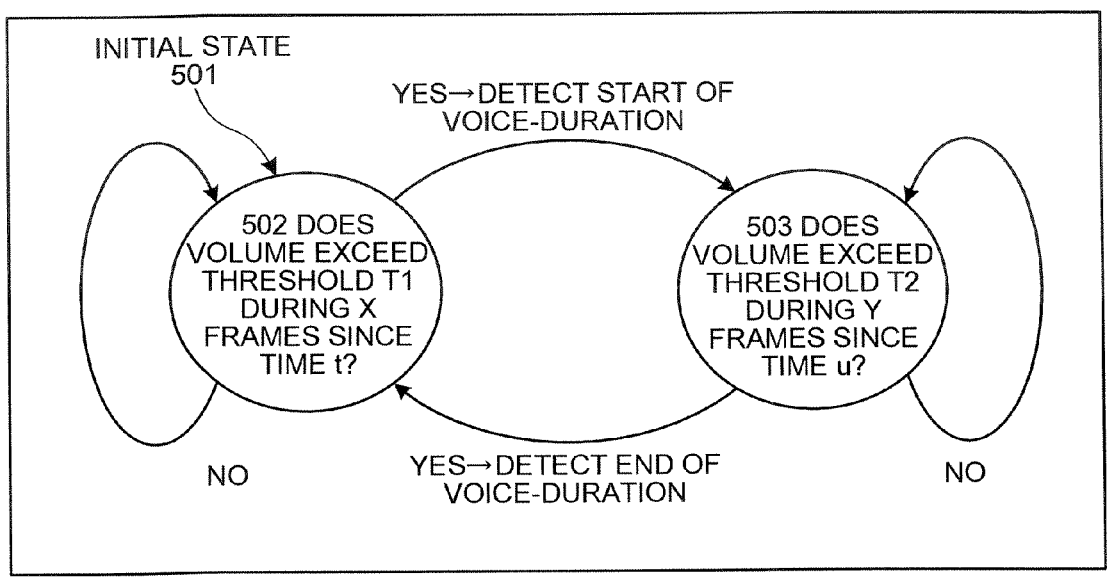
FIG. 5 is an explanatory view of an example of processing states in which the voice-duration detection processing is performed.

Next, a state transition in the voice-duration detection processing will be explained. FIG. 5 is an explanatory view of an example of processing states in voice-duration detection processing.

A state just after the speech processing apparatus 100 is activated is an initial state 501 shown in left of FIG. 5. When the voice-duration detecting unit 202 starts the voice-duration detection processing, the state is changed to a state of waiting for detection of the start of the voice-duration (voiceless state). In this state, the voice-duration detecting unit 202 makes a determination 502 (as to whether the volume is higher than the threshold T1 during the X frames since the time t till present) corresponding to the step S402 shown in FIG. 4. At this time, the voice-duration detecting unit 202 can refer to volumes for previous X frames.

If the volume is not higher than the threshold T1, the state remains the state of waiting for detection of the start of the voice-duration. If the volume is higher than the threshold T1, the voice-duration detecting unit 202 detects the time t as the start of the voice-duration. In addition, the state of the voice-duration detecting unit 202 is changed to a state of waiting for detection of the end of the voice-duration (voice state). In the state of waiting for the end of the voice-duration, the voice-duration detecting unit 202 makes a determination 503 (as to whether the volume is lower than the threshold T2 during the Y frames since the time u till present) corresponding to the step S405 shown in FIG. 4.

If the volume is not lower than the threshold T2, the state of the voice-duration detecting unit 202 remains the state of waiting for detection of the end of the voice-duration. If the volume is lower than the threshold T2, the voice-duration detecting unit 202 detects the time u as the end of the voice-duration. In addition, the state of the voice-duration detecting unit 202 is changed to the state of waiting for the start of the voice-duration.

The voice-duration detection processing performed by the voice-duration detecting unit 202 is not limited to the voice-duration detection processing based on the method explained above. The voice-duration detecting unit 202 can perform a voice-duration detection processing based on any one of conventional methods. For instance, the voice-duration detecting unit 202 can detect the voice-duration more precisely by additionally performing the following processings. The voice-duration detecting unit 202 estimates an intensity of a surrounding noise from a voice signal in the state of waiting for the start of the voice-duration (voiceless state). In addition, the voice-duration detecting unit 202 changes the thresholds T1 and T2 according to the estimated intensity of the surrounding noise.

Figure 6:
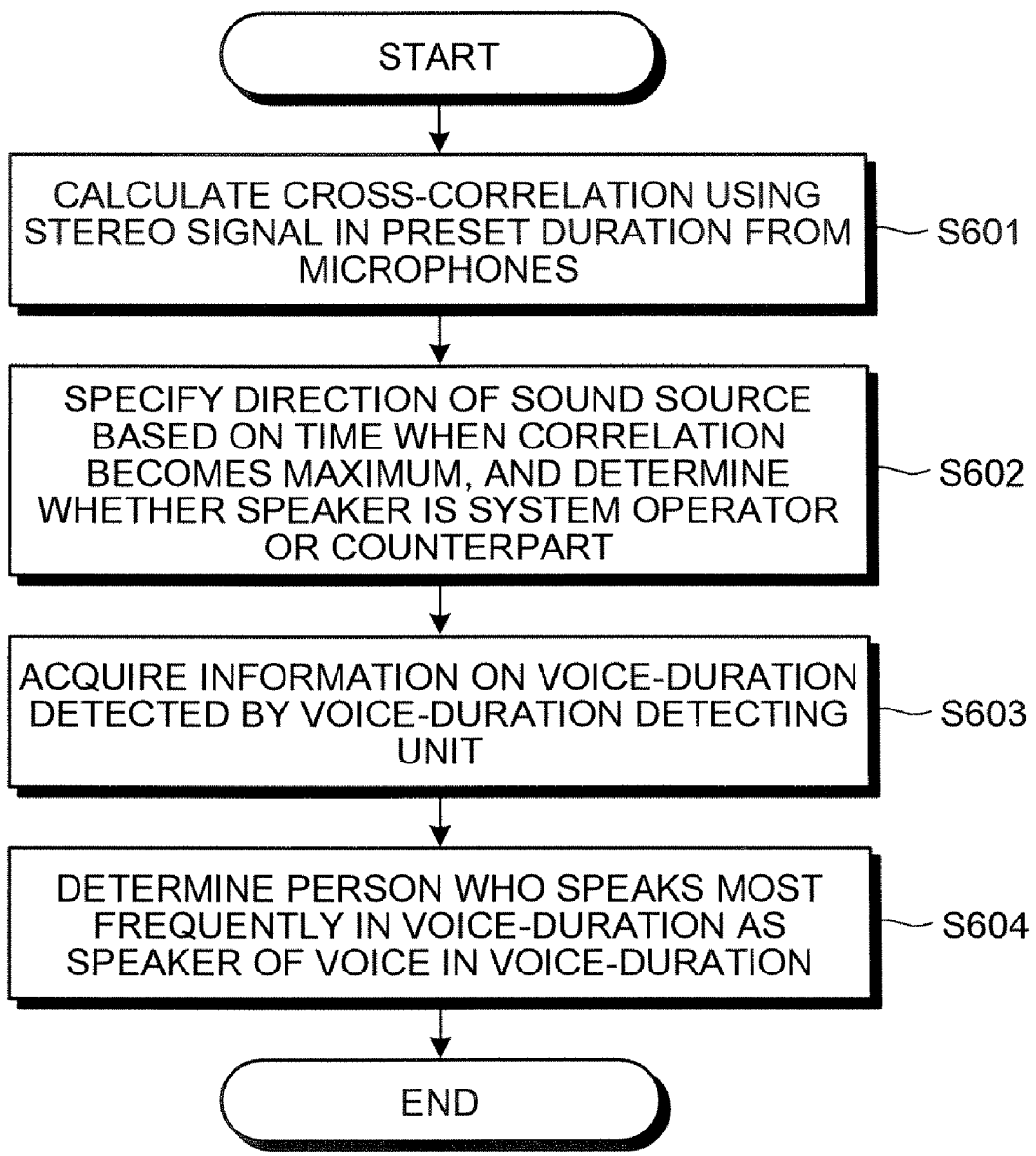
FIG. 6 is a flowchart of a speaker determination processing according to the first embodiment.

The speaker determination processing at the step S304 will be explained. FIG. 6 is a flowchart of an overall flow of the speaker determination processing according to the first embodiment.

First, the speaker determining unit 203 calculates a cross-correlation function based on a present frame using the stereo signal that is the signal in a preset duration and that is obtained from the analog voice signals output from the two respective microphones 104a and 104b (step S601).

The speaker determining unit 203 specifies a direction of a sound source based on time when correlation becomes maximum, and determines whether the speaker is the system operator 101 or the counterpart 102 (step S602). The positions of the microphones 104a and 104b and the relative positional relationship between the system operator 101 and the counterpart 102 are fixed. Therefore, the speaker determining unit 203 determines the person who is located in the direction of the specified sound source as the speaker in each frame.

The speaker determining unit 203 acquires information on the voice-duration detected by the voice-duration detecting unit 202 (step S603). The speaker determining unit 203 determines the person who speaks most frequently in the voice-duration as the speaker in the voice-duration (step S604).

If the speaker determining unit 203 determines that the same person speaks for time longer than predetermined time, the speaker determining unit 203 can determine that the person is the speaker of the voice in a corresponding duration in the voice-duration. If the speaker determining unit 203 determines that the speaker is changed at a boundary of certain time, the voice-duration can be divided at the boundary. It is thereby possible to determine one speaker per voice-duration. It is assumed that speeches of a plurality of speakers are not present in one voice-duration.

The speaker determination processing performed by the speaker determining unit 203 is not limited to the method explained above. The speaker determining unit 203 can use any one of various conventional techniques capable of determining the speaker for the voice-duration.

The processing-content judging process at the step S305 will be explained in detail.

Figure 7:
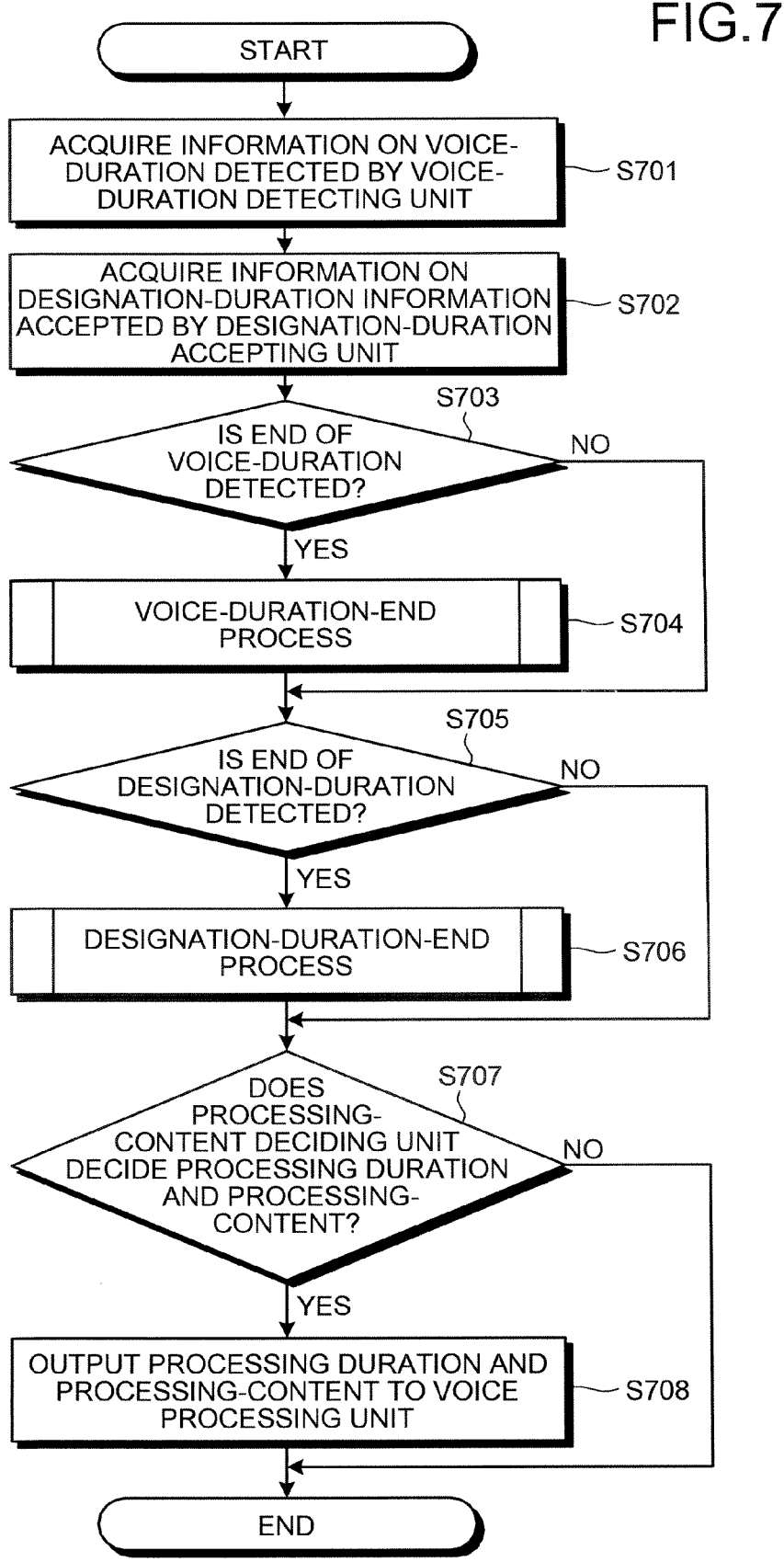
FIG. 7 is a flowchart of a processing content determination processing according to the first embodiment.

FIG. 7 is a flowchart of an overall flow of the processing-content judging process according to the first embodiment.

First, the processing-content determining unit 205 acquires information on the voice-duration detected by the voice-duration detecting unit 202 from the storage region (not shown) (step S701).

The processing-content determining unit 205 acquires information on the designation-duration accepted by the designation-duration accepting unit 204 (step S702).

If starts and ends of the designation-duration and the voice-duration are acquired by the designation-duration acceptance processing at the step S302 and the voice-duration detection processing at the step S303, the information is recorded in the storage region (not shown) as processing duration candidates. At the steps S701 and S702, the processing-content determining unit 205 acquires the recorded information from the storage region.

Furthermore, after the processing-content determining unit 205 decides the processing duration and the processing-content by the processing-content judging process and the speech processing unit 206 performs the speech processing with the decided processing-content, the voice-duration or the designation-duration, the end of which is determined, out of the processing duration candidates is deleted from the storage region.

The processing-content determining unit 205 determines whether the end of the voice-duration is detected (step S703). If the end of the voice-duration is detected (S703: YES), the processing-content determining unit 205 performs a designation-duration-end processing for deciding the processing duration based on the relationship between the voice-duration the end of which is detected and the designation-duration, and information on the speaker (step S704). The voice-duration-end processing will be explained later in detail.

If the end of the voice-duration is not detected at the step S703 (step S703: NO), or after the processing-content determining unit 205 performs the voice-duration-end processing, the processing-content determining unit 205 determines whether the end of the designation-duration is detected (step S705).

If the end of the designation-duration is detected (step S705: YES), the processing-content determining unit 205 performs a designation-duration-end processing for deciding the processing duration based on the relationship between the designation-duration the end of which is detected and the voice-duration, and the information on the speaker (step S706). The designation-duration-end processing will be explained later in detail.

If the end of the designation-duration is not detected (step S705: NO), then the processing-content determining unit 205 determines whether the processing duration and the processing-content are decided after performing either the designation-duration-end processing or the voice-duration-end processing (step S707).

If the processing duration and the processing-content are decided (step S707: YES), the processing-content determining unit 205 outputs the processing duration and the processing-content to the speech processing unit 206 (step S708), and finishes the processing-content judging process.

If the processing duration and the processing-content are not decided (step S707: NO), the processing-content determining unit 205 finishes the processing-content judging process without outputting the processing duration and the processing-content. In this case, the processing-content determining unit 205 holds the information on the processing duration candidates and performs a processing for a next frame.

Figure 8:
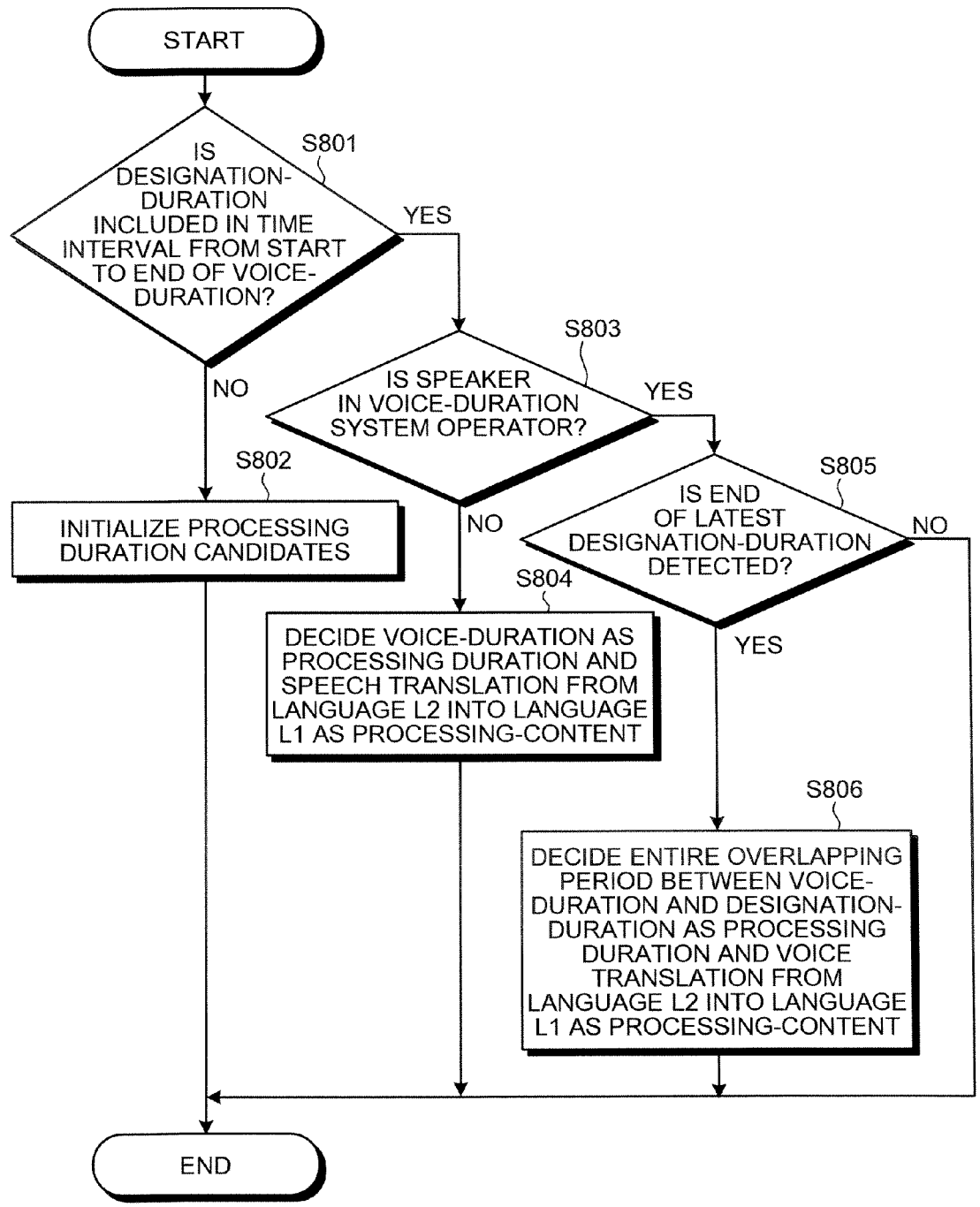
FIG. 8 is a flowchart of a voice-duration-end detection processing according to the first embodiment.

The voice-duration-end processing at the step S703 will be explained in detail. FIG. 8 is a flowchart of an overall flow of the voice-duration-end processing according to the first embodiment.

The processing-content determining unit 205 determines whether the designation-duration is included in the time interval from the start to the end of the voice-duration (step S801). If the designation-duration is not included in the time interval from the start to the end of the voice-duration (step S801: NO), the processing-content determining unit 205 initializes the processing duration candidates and finishes the voice-duration-end processing (step S802).

Figure 10:
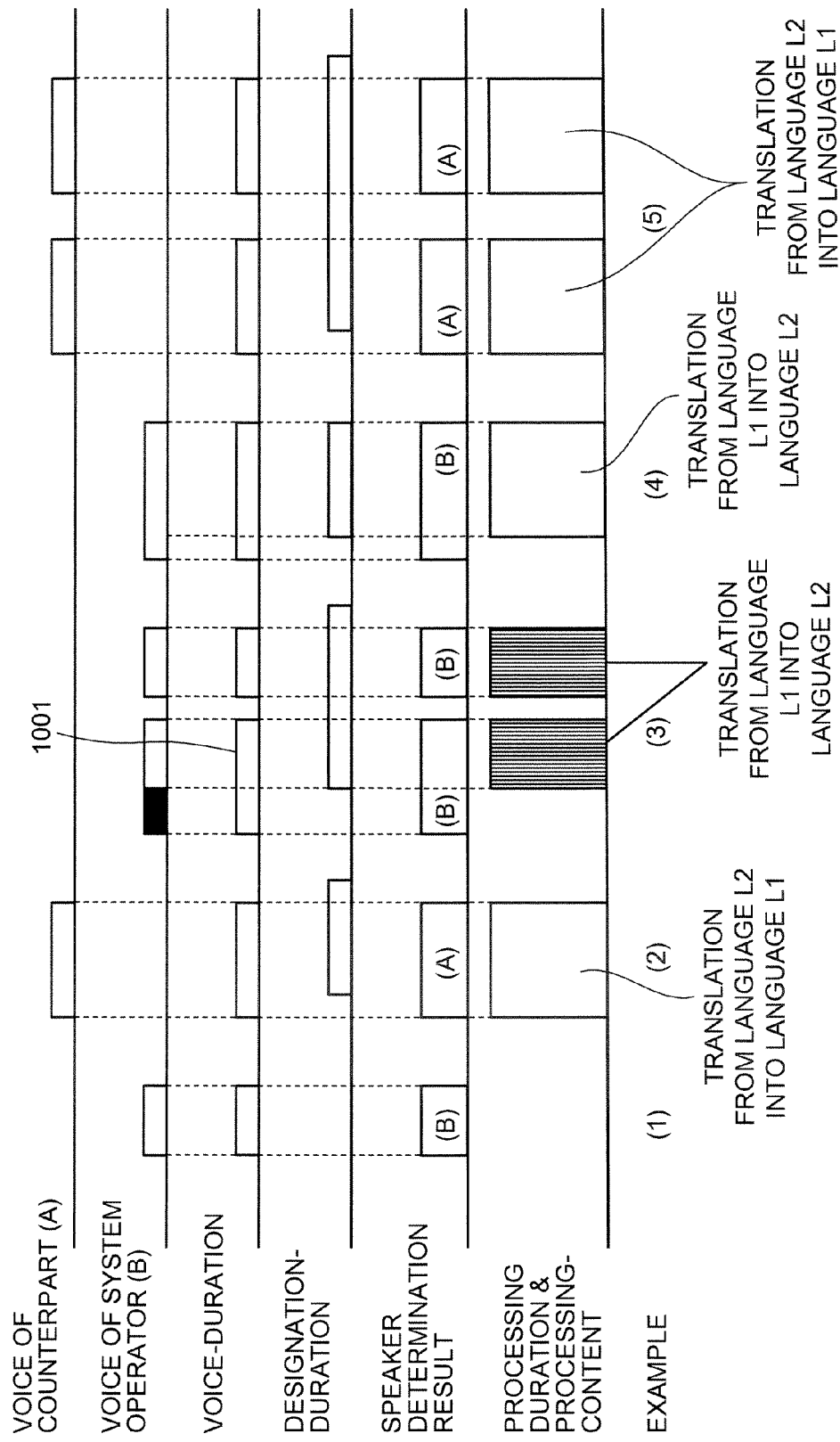
FIG. 10 is an explanatory view of examples of various pieces of information processed according to the first embodiment.

Specific examples in which the processing-content and the like are decided in the manner like the step S802 will be explained with reference to FIG. 10. FIG. 10 is an explanatory view of examples of various pieces of information processed according to the first embodiment. In FIG. 10, the system operator 101 is denoted by symbol (B) and the counterpart 102 is denoted by symbol (A).

Example (1) represents a situation in which the processing duration and the processing-content are decided in the manner like the step S802. Specifically, the example (1) is an example of the situation in which the system operator (B) is the speaker but in which the designation-duration is not input.

In the first embodiment, the designation-duration is not included in the detected voice-duration in the example (1). Due to this, the processing-content determining unit 205 initializes the voice-duration as the processing duration candidate without deciding the processing duration (step S802).

The reason is as follows. If the system operator 101 is the speaker but the designation-duration is not included in the detected voice-duration, the system operator 101 can judge that the voice is an undesired processing-target sound. Namely, the detected voice-duration is not the processing duration. Through the processing, it is possible to reduce the probable malfunction by receiving the noise or voice that should not be processed.

If the processing-content determining unit 205 determines that the designation-duration is included in the time interval from the start to the end of the voice-duration (step S801: YES), the processing-content determining unit 205 determines whether the speaker in the voice-duration is the system operator 101 based on the information on the speaker determined by the speaker determining unit 203 (step S803).

If the speaker is not the system operator 101, that is, the speaker is the counterpart 102 (step S803: NO), the processing-content determining unit 205 decides the detected voice-duration as the processing duration and then decides speech translation from the language L2 into the language L1 as the processing-content (step S804). The processing-content determining unit 205 finishes the voice-duration-end processing.

Referring back to FIG. 10, example (2) represents a situation in which the processing duration and the processing-content are decided in the manner like the step S804.

Specifically, the example (2) is an example of a situation in which the system operator (B) designates the designation-duration at slightly delayed timing from timing when the counterpart (A) speaks. In the situation, the voice-duration detecting unit 202 detects the voice-duration, and the speaker determining unit 203 determines that the voice-duration corresponds to the counterpart (A).

If the system operator (B) inputs the designation-duration in response to the voice of the counterpart 102 by depressing the press-to-talk button 105, the system operator (B) cannot accurately grasp the start and the end of the voice-duration of the person other than the system operator (B). Due to this, there is a probability of an offset between the start and end of the voice-duration and the ON and OFF of the press-to-talk button 105 can be considered. As a result, as indicated by a part of the designation-duration shown in the example (2), the voice-duration and the designation-duration are detected with the offset therebetween.

In the first embodiment, even if the offset is present, the processing-content determining unit 205 can decides the detected voice-duration as the processing duration and the speech recognition and the translation from the language L2 into the language L1 as the processing-content (step S804).

With the conventional method, the duration for processing the voice of the counterpart cannot be explicitly designated by the button or the like and all sounds are dealt with. As a result, there is the probability of the malfunction due to the processing on the unnecessary noise or the like. In the first embodiment, by contrast, the processing duration can be designated even for the voice of the counterpart 102. The probability of the malfunction can be, therefore, reduced.

Moreover, when the designation-duration is designated for the voice of the counterpart 102, there is a probability of an offset between the actual voice-duration and the designation-duration. In the first embodiment, it is possible to appropriately decide the processing duration and perform the speech processing. Namely, if the system operator 101 desires to perform the processing for the voice of the counterpart 102, the designation of the designation-duration is started so that the designation-duration overlaps with the voice-duration. By doing so, the voice-duration is determined as the processing duration and the voice of the counterpart 102 can be set as the speech processing target.

Normally, timings of the start and end of the voice-duration of the counterpart 102 are unknown. However, the voice-duration can be determined as the processing duration by inputting the information on the designation-duration during the voice. The system operator 101 can, therefore, decide the voice-duration of the voice as desired by the counterpart 102 as the processing duration.

If the processing-content determining unit 205 determines that the speaker in the voice-duration is the system operator 101 (step S803: YES), the processing-content determining unit 205 determines whether an end of a latest designation-duration is detected (step S805).

If the end of the latest designation-duration is not detected (step S805: NO), judgment materials for the processing interval are insufficient. If so, the processing-content determining unit 205 holds all the processing duration candidates of the voice-duration and the designation-duration, i.e., suspends determination of the processing duration and finishes the voice-duration-end processing.

The first half (up to time when the voice in a voice-duration 1001 is completed) of example (3) shown in FIG. 10 represents an example in which the processing-content determining unit 205 determines that the end of the latest designation-duration is not detected at the step S805.

In the example (3), the voice of the system operator (B) is detected while the voice-duration is divided into two voice-durations. At time of determination as to the first voice-duration, the end of the designation-duration is not detected yet. Due to this, the processing-content determining unit 205 suspends determination of the processing duration and the like and finishes the voice-duration-end processing. Furthermore, after the end of the designation-duration is detected, the two divided voice-durations are combined and the speech processing is performed with the combined voice-duration set as the processing duration.

Through the processing, when the system operator 101 produces a voice of a certain sentence, the designation-duration is a duration in which the entire sentence is designated. However, even if two voice-durations are detected by the voice-duration detection processing because the system operator 101 fumbles for a right word in the middle of the speech, it is possible to avoid dividing the processing duration for every voice-duration.

Moreover, by avoiding dividing the processing duration for every voice-duration, it is possible to prevent deterioration in accuracies for the speech recognition processing and the translation processing. If the speech recognition processing is performed using language information such as a language model, context information is employed. Due to this, if the speech is integrally processed for one sentence, the context information can be made effective use of.

If the end of the latest designation-duration is detected (step S805: YES), the processing-content determining unit 205 decides all the overlapping periods between the voice-duration and the designation-duration as the processing duration and decides the speech translation from the language L1 into the language L2 as the processing-content (step S806). The processing-content determining unit 205 then finishes the voice-duration-end processing.

Referring back to FIG. 10, example (4) represents a situation in which the processing duration and the processing-content are decided in the manner like the step S806. Specifically, the example (4) is an example of the situation in which the system operator (B) speaks and in which the designation-duration is designated for a part excluding a first part of the voice.

In the example (4), the overlapping period between the voice-duration and the designation-duration is equivalent to the designation-duration. Therefore, the designation-duration is decided as the processing duration. Moreover, because the speaker is the system operator 101, the speech translation from the language L1 into the language L2 is decided as the processing-content.

Through the above processing, the system operator can set a desired interval of the sound as the processing duration. For example, when unnecessary words are deleted or the surrounding noise is present, the system operator 101 turns off the microphones 104a and 104b. It is thereby possible to set only the necessary duration as the processing duration and avoid the malfunction.

Moreover, for example, the system operator 101 uses a foreign language for most parts of the voice, and uses his/her mother language for parts which the system operator 101 does not know how to express in the foreign language. The system operator 101 designates a time interval in which the system operator 101 uses his/her mother language as the designation-duration. Therefore, only the latter part can be decided as a speech translation processing target. By doing so, even if the two languages are mixed in the voice, the system operator 101 can convey the intention of the voice to the counterpart 102.

If the start of the voice-duration is included in the designation-duration, the start of the voice-duration can be set as the start of the designation-duration. By doing so, even when the system operator 101 starts speaking after passage of time since the system operator 101 depresses the press-to-talk button 105, not the start of depression of the press-to-talk button 105 but the start of the voice detection can be decided as the start of the processing duration.

Figure 9:
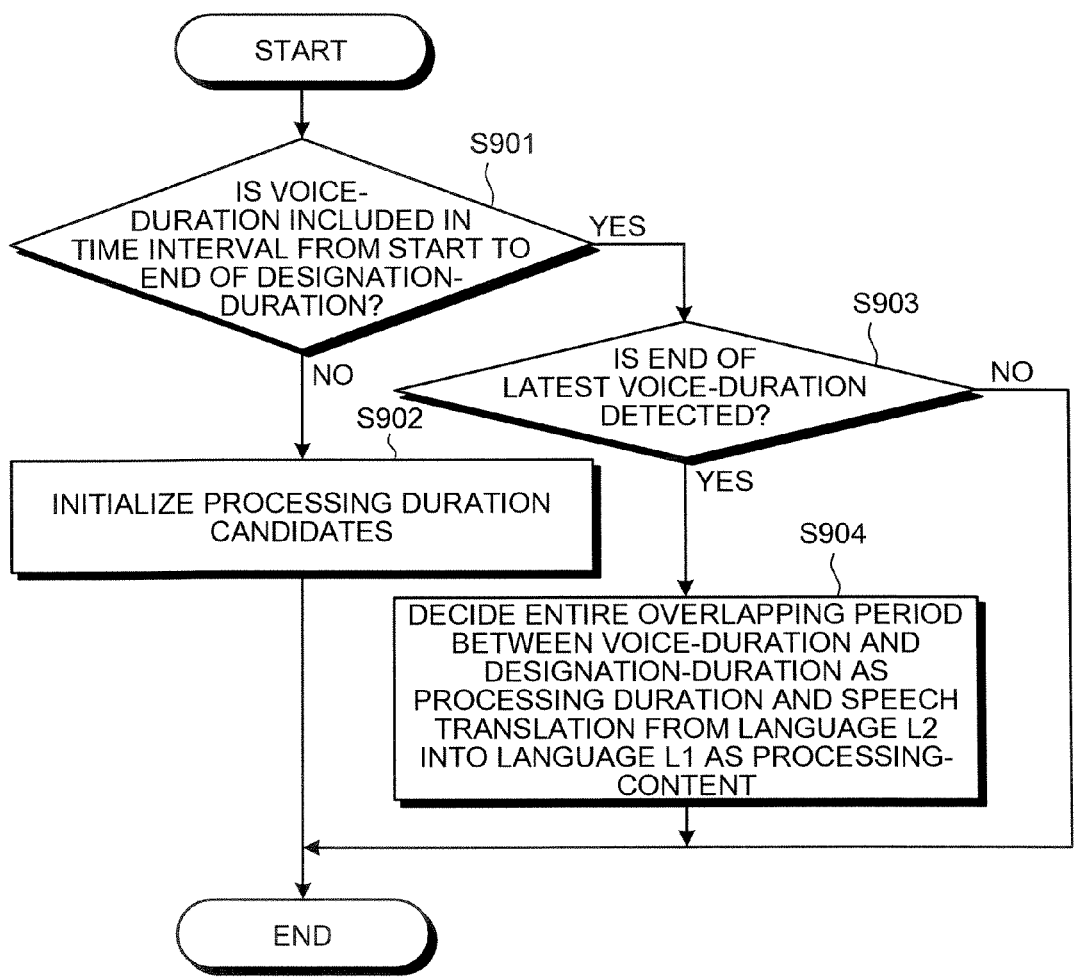
FIG. 9 is a flowchart of a designation-duration-end detection processing according to the first embodiment.

The designation-duration-end processing at the step S706 will be explained in detail with reference to FIG. 9. FIG. 9 is a flowchart of an overall flow of the designation-duration-end processing according to the first embodiment.

First, the processing-content determining unit 205 judges whether the voice-duration is included in the time interval from the start to the end of the designation-duration (step S901). If the voice-duration is not included in the time interval from the start to the end of the designation-duration (step S901: NO), the processing-content determining unit 205 initializes the processing duration candidates and finishes the designation-duration-end processing (step S902).

Through the processing, even if the system operator 101 designates the designation-duration, the speech processing is not performed before the voice is detected. It is, therefore, possible to prevent the malfunction due to the operation error or the noise.

If the voice-duration is judged to be included in the time interval from the start to the end of the designation-duration (S901: YES), the processing-content determining unit 205 determines whether an end of a latest voice-duration is detected (step S903).

If the end of the latest voice-duration is not detected (step S903: NO), the processing-content determining unit 205 determines that a final determination cannot be made for the processing duration and suspends determination of the processing duration and finishes the designation-duration-end processing.

If the end of the latest voice-duration is detected (step S903: YES), the processing-content determining unit 205 decides the overlapping period between the voice-duration and the designation-duration as the processing duration and decides the speech translation from the language L1 into the language L2 as the processing-content (step S904). The processing-content determining unit 205 then finishes the designation-duration-end processing.

If the speaker is the counterpart 102, the processing-content determining unit 205 decides the processing duration when the end of the voice-duration is detected (step 804). Due to this, the processing-content determining unit 205 does not make the determination processing at the step S903. Therefore, in the designation-duration-end processing shown in FIG. 9, there is no need to determine the speaker differently from the step S803 in the voice-duration-end processing. In addition, the processing-content determining unit 205 can decide the processing-content (speech translation from the language L1 into the language L2) while assuming that the speaker is the system operator 101.

Referring back to FIG. 10, the example (3) is an example of a situation in which the processing duration and the processing-content are decided in the manner like the step S904. Specifically, the example (3) represents the situation in which the system operator (B) speaks and in which the voice-duration is divided into two voice-durations and the two divided voice-durations are detected because a pause is inserted in the middle of the voice. The example (3) also represents the situation in which the system operator (B) produces a voice of an unnecessary word meaning "er" at the start of the first voice-duration. In FIG. 10, a black-painted duration of the voice of the system operator (B) represents the unnecessary word part.

In the situation of the example (3), the system operator (B) intends to set a sound obtained by combining two divided sounds except for the unnecessary word as the target sound. Due to this, the system operator (3) starts designation of the designation-duration after producing the voice of the unnecessary word, and finishes designation of the designation-duration after end of the voice.

In the first embodiment, in the situation of the example (3), the processing-content determining unit 205 can decide the entire designation-duration in the detected voice-duration as the processing duration and the speech recognition and decide translation from the language L1 into the language L2 as the processing-content (step S904). If the end of the voice-duration is later than the end of the designation-duration, the processing-content determining unit 205 can similarly decide the processing duration at the step S806.

As a result, the processing duration for the speech processing is a combination of the durations indicated by vertical lines of the example (3) in FIG. 10. Accordingly, the translation processing can be performed on the speech recognition processing result for the sound obtained by combining the two divided sounds, and the accuracy for the translation processing can be improved.

By doing so, if the system operator 101 speaks "er, I (pause) want to go to the station" and depresses the press-to-talk button 105 at a part "I (pause) want to go to the station", the unnecessary word "er" is not processed. In addition, the part "I want to go to the station" is regarded as the target sound without dividing the part into the part "I" and the part "want to go to the station". It is, therefore, possible to grasp that the subject and the object of "want to go" are "I" and "the station", respectively, and perform high accuracy translation.

Another specific example of the speech processing according to the first embodiment will be explained with reference to FIG. 10.

Example (5) is an example of a situation in which the counterpart (A) speaks two sentences whereas the system operator (B) keeps turning on the press-to-talk button 105 for designating the designation-duration.

In the situation of the example (5), the system operator (B) cannot grasp the timings of the start and end of the voice-duration of the counterpart (A), and cannot determine whether the sound includes two sentences only from the voice. In the first embodiment, even in the situation of the example (5), the processing-content determining unit 205 decides the two detected voice-durations as the processing duration and decides the speech recognition and translation from the language L2 into the language L1 as the processing-content (step S804).

The situation of the example (5) and that of the example (3) are identical in the relationship between the voice-duration and the designation-duration but different from each other only in speaker. In the situation of the example (3), the speaker is the system operator (B), so that the processing target voice-duration can be accurately designated. The processing-content determining unit 205 can, therefore, decide the duration excluding the unnecessary word as the processing duration.

On the other hand, in the situation of the example (5), the speaker is the counterpart (A), so that the processing target voice-duration cannot be accurately designated. The processing-content determining unit 205 can, therefore, appropriately decide the processing duration without deleting the part of the offset between the voice-duration and the designation-duration as the unnecessary word.

In this manner, the speech processing apparatus according to the first embodiment can appropriately decide the processing duration that is the sound duration of the target sound processing based on the designation-duration designated by the system operator, the voice-duration detected from the input sound, and the speaker obtained by referring information on the sounds input from a plurality of microphones. It is, therefore, possible to reduce occurrence of the malfunction without processing unnecessary voice.

A speech processing apparatus according to a second embodiment of the present invention includes a camera in place of the press-to-talk button, and accepts designation of the designation-duration of the target sound according to a change in an image of a speaker's face picked up by the camera.

Figure 11:
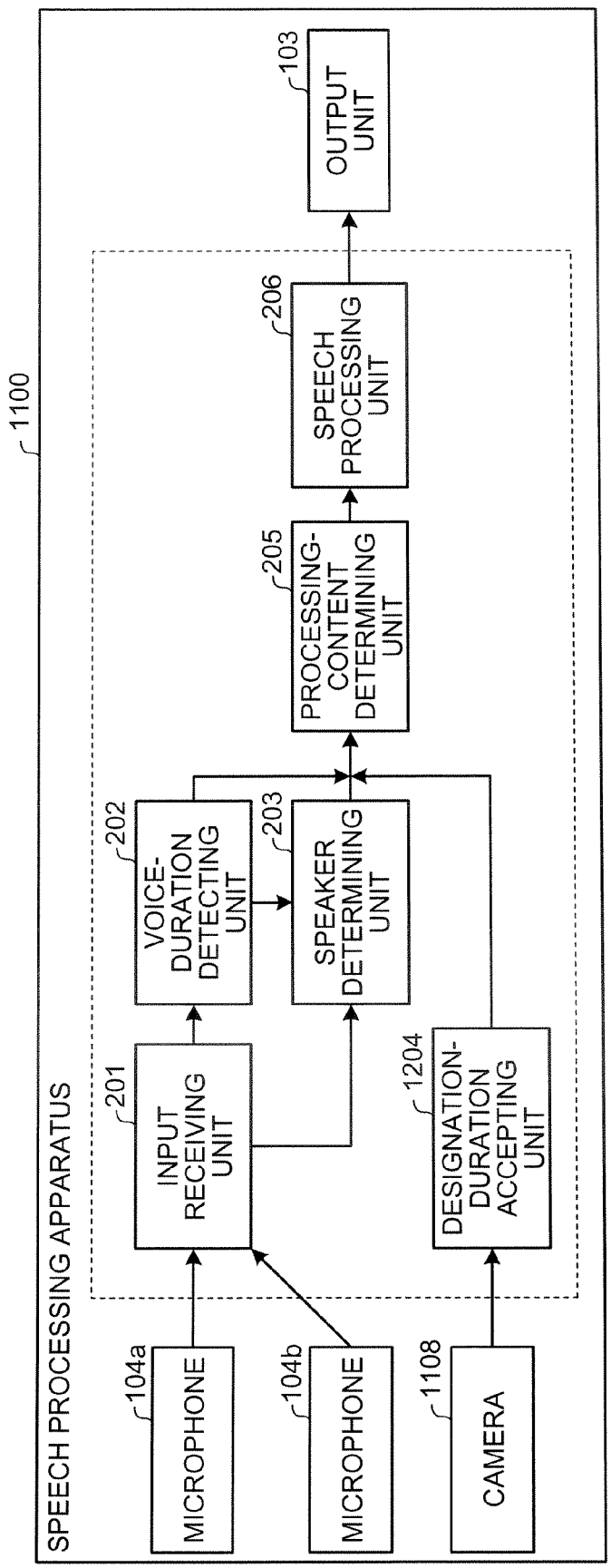
FIG. 11 is a block diagram of a speech processing apparatus according to a second embodiment.

FIG. 11 is a block diagram of a speech processing apparatus 1100 according to the second embodiment. As shown in FIG. 11, the speech processing apparatus 1100 includes the output unit 103, the microphones 104a and 104b, a camera 1108, the input receiving unit 201, the voice-duration detecting unit 202, the speaker determining unit 203, a designation-duration accepting unit 1204, the processing-content determining unit 205, and the speech processing unit 206.

The second embodiment differs from the first embodiment in that the camera 1108 is provided in place of the press-to-talk button 105 and in function of the designation-duration accepting unit 1204. The other constituent elements and functions of the speech processing apparatus 1100 are the same as those of the speech processing apparatus 100 according to the first embodiment shown in FIG. 2. Therefore, the same constituent elements shown in FIG. 11 are denoted by the same reference symbols as those shown in FIG. 2 and will not be explained herein repeatedly.

The camera 1108 picks up a face image of the speaker. The camera 1108 can be constituted by any one of conventional imaging devices such as an imaging device including an optical system component such as a lens for picking up the image, a charge-coupled device (CCD), a CCD drive circuit, and an A/D converter.

The designation-duration accepting unit 1204 analyzes a face image picked up by the camera 1108, extracts a line of vision of the speaker, and accepts a duration in which the line of vision is directed to the speech processing apparatus 1100 as the designation-duration. Such a method of analyzing a face image and extracting a line of vision of the speaker can include any one of a conventionally method, such as a method of matching patterns of feature quantity calculated from face parts, e.g., eyes and a nose.

Figure 12:
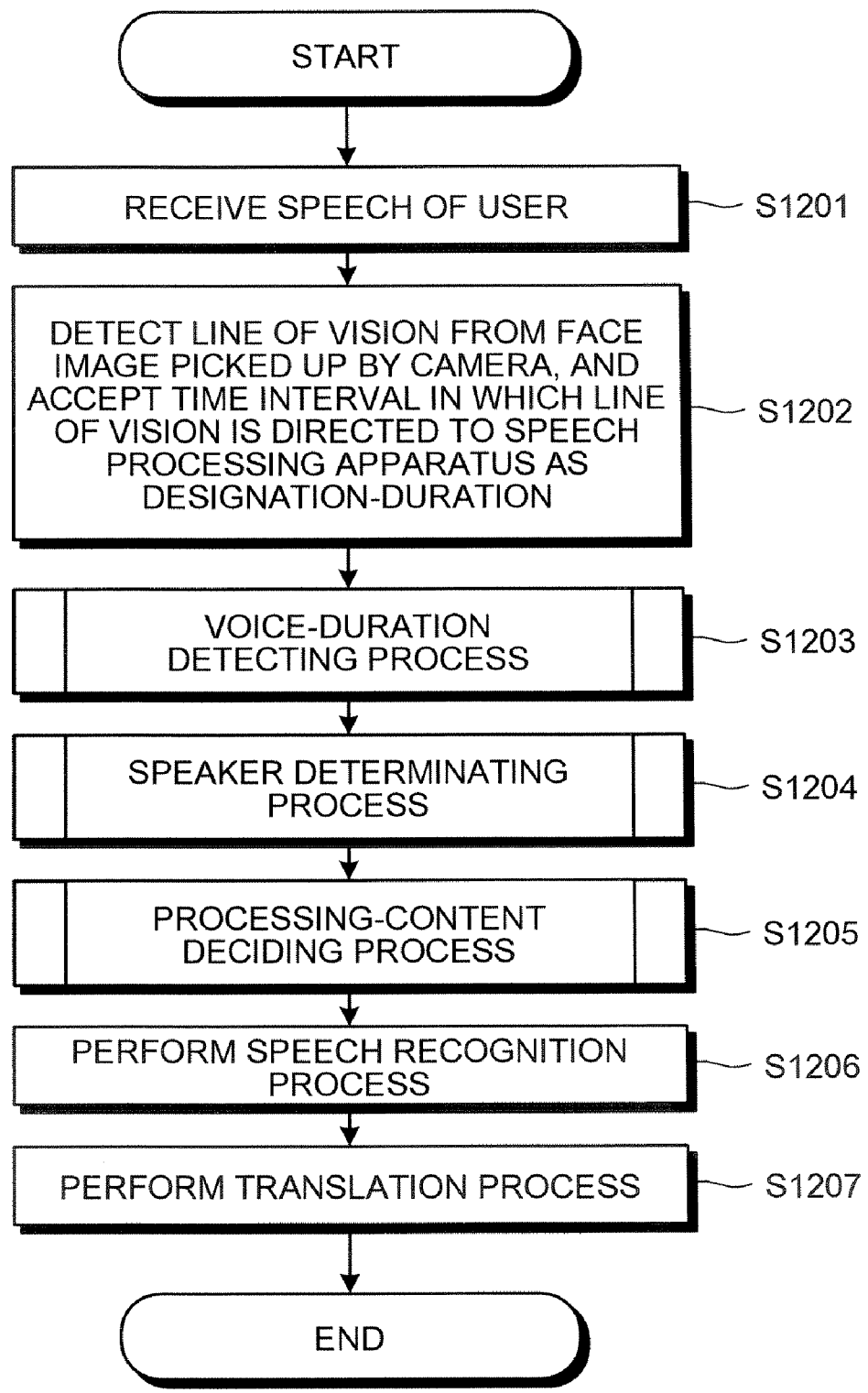
FIG. 12 is a flowchart of a speech processing according to the second embodiment.

Next, the speech processing of the speech processing apparatus 1100 according to the second embodiment will be explained in detail. FIG. 12 is a flowchart of a speech processing according to the second embodiment.

The input accepting processing of step S1201 is the same as that in the step S301 for the speech processing apparatus 100 according to the first embodiment. The processing will not be, therefore, repeatedly explained.

After the input accepting unit 210 accepts a sound input, the designation-duration accepting unit 1204 detects the line of vision from the face image picked up by the camera 1108 and accepts a duration in which the line of vision is directed to the speech processing apparatus 1100 as the designation-duration (step S1202). Specifically, the designation-duration accepting unit 1204 detects the line of vision from the face image in each frame. In addition, the designation-duration accepting unit 1204 accepts the duration since the line of vision is directed to the speech processing apparatus 1100 until the line of vision is deviated from the speech processing apparatus 1100 as the designation-duration.

The voice-duration detection processing, the speaker determination processing, the processing-content determination processing, and the speech processing from steps S1203 to S1207 are the same as those from the steps S303 to S307 for the speech processing apparatus 100 according to the first embodiment. The processing will not be, therefore, repeatedly explained.

In this manner, the speech processing apparatus 1100 according to the second embodiment includes the camera 1108 in place of the press-to-talk button 105. In addition, the speech processing apparatus 1100 can accept the designation-duration in which the voice is processed according to a change in the face image of the speaker picked up by the camera 1108. It is, therefore, possible to lessen the burden of the system operator's depression of the button or the like, and improve operability of the speech processing apparatus 1100.

A speech processing apparatus according to a third embodiment of the present invention will be explained.

In the first and second embodiments, it is assumed that the counterpart 102 speaks "it is fine today (pause) and comfortable" and that the system operator 101 responds to the counterpart 102 saying "yeah" at the pause. Even if the designation-duration is continuously designated, the problem of dividing the voice-duration into two voice-durations possibly occurs.

As a result, the speech processing is performed three times, that is, translation of "it is fine today" from the language L2 into the language L1, translation of "yeah" from the language L1 into the language L2, and translation of "comfortable" from the language L2 into the language L1. If a sentence is divided, the accuracy for the speech processing is deteriorated and the processing result may possibly inappropriate.

The third embodiment, therefore, is intended to improve the accuracy for the speech processing by performing the speech processing without changing the determined speaker while the designation-duration is being accepted.

The third embodiment differs from the first embodiment in function of the speaker determining unit 203. The other constituent elements and functions of the speech processing apparatus in the third embodiment are the same as those of the speech processing apparatus 100 according to the first embodiment shown in FIG. 2. Therefore, the same constituent elements are denoted by the same reference symbols as those shown in FIG. 2 and will not be explained herein repeatedly.

The speaker determining unit 203 according to the third embodiment differs from that according to the first embodiment as follows. The speaker determining unit 203 does not perform the speaker determination processing if the system operator 101 is depressing the press-to-talk button 105 and the speaker is already determined.

Figure 13:
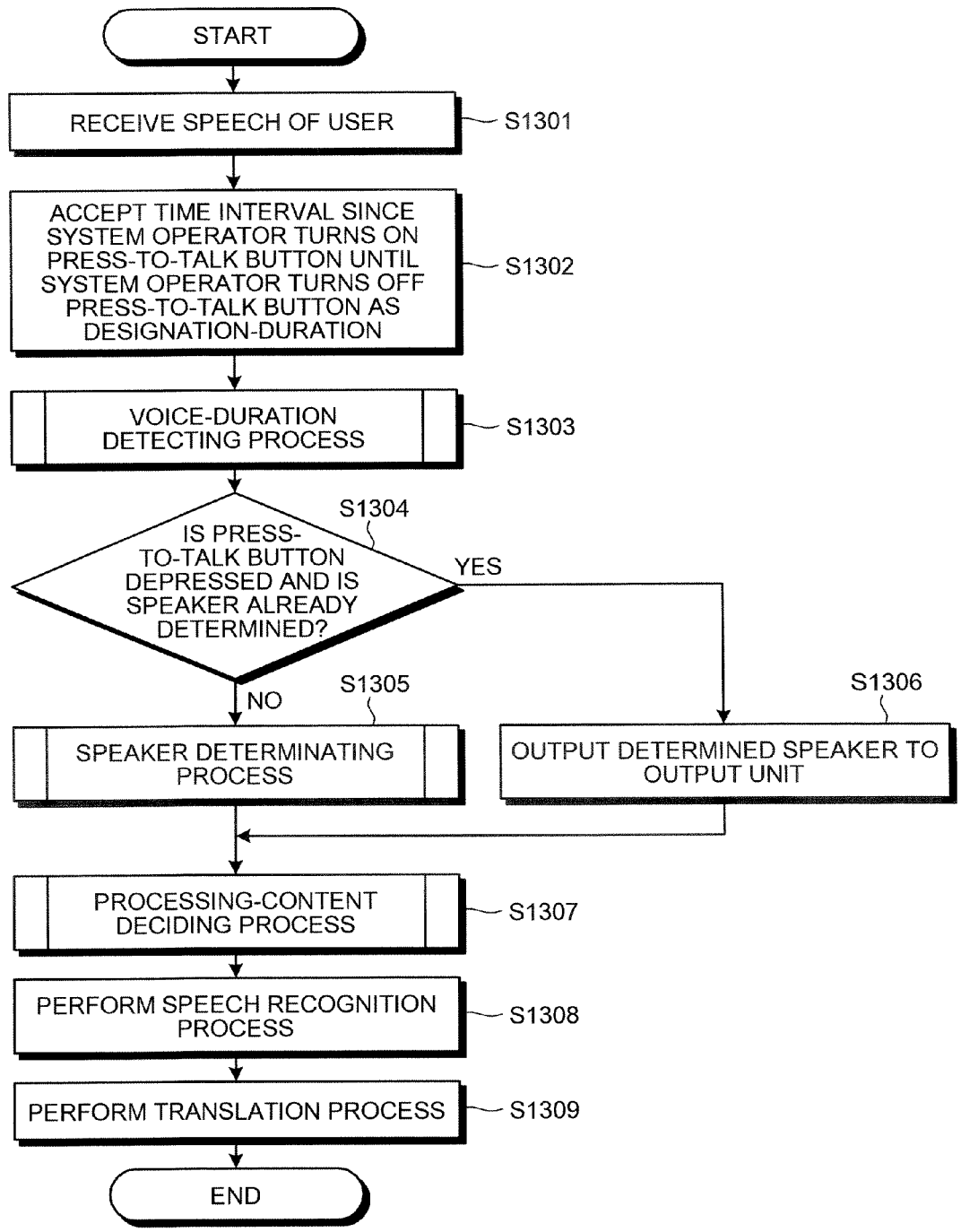
FIG. 13 is a flowchart of a speech processing according to a third embodiment.

An overall flow of the speech processing according to the third embodiment will be explained with reference to FIG. 13. FIG. 13 is a flowchart of the overall flow of the speech processing according to the third embodiment.

The input receiving processing, the designation-duration acceptance processing, and the voice-duration detection processing from steps S1301 to S1303 are the same as those from the steps S301 to S303 for the speech processing apparatus 100 according to the first embodiment. The processings will not be, therefore, repeatedly explained.

After the voice-duration detection processing, the speaker determining unit 203 determines whether the system operator 101 is depressing the press-to-talk button 105 and the speaker is already determined (step S1304).

If the system operator 101 does not depress the press-to-talk button 105 and the speaker is not determined yet (step S1304: NO), the speaker determining unit 203 performs the speaker determining processing (step S1305).

If the system operator 101 depresses the press-to-talk button 105 and the speaker is already determined (step S1304: YES), the speaker determining unit 203 outputs information on the determined speaker to the output unit 103 without performing the speaker determining processing (step S1306). The system operator 101 can thereby grasp whether the speaker is correctly determined.

In this manner, while the designation-duration is designated, the speaker can be fixed and the speech processing on a short response or a sudden noise can be performed without intermission. Alternatively, the speech processing apparatus can be configured to fix the speaker until the end of the voice-duration is detected.

The processing-content determining processing and the speech processing from steps S1307 to S1309 are the same as those from the steps S305 to S307 for the speech processing apparatus 100 according to the first embodiment. The processings will not be, therefore, explained herein.

Because of the above functions, if the system operator 101 continuously designate the designation-duration at, for example, the part of "it is fine today", the speaker in the designation-duration is fixed to the counterpart 102. Furthermore, if it is not determined that the speech ends at the pause, the entire voice of "it is fine today and comfortable" can be set as the speech in the processing duration. Moreover, because the speaker in the processing duration can be determined as the counterpart 102, it is possible to gather the voice only from the microphone 104b oriented to the counterpart 102 without gathering surrounding and unnecessary short voices.

In this manner, the speech processing apparatus according to the third embodiment can perform the speech processing while fixing the determined speaker while the designation-duration is designated. It is, therefore, possible to improve the accuracy for the speech processing.

A speech processing apparatus according to a fourth embodiment of the present invention calculates a reliability of a detected voice-duration and adjusts the start and end of the processing duration according to the reliability.

The fourth embodiment differs from the first embodiment in functions of the voice-duration detecting unit 202 and the processing-content determining unit 205. The other constituent elements and functions of the speech processing apparatus according to the fourth embodiment are the same as those of the speech processing apparatus 100 according to the first embodiment shown in FIG. 2. Therefore, the same constituent elements of the speech processing apparatus according to the fourth embodiment are denoted by the same reference symbols as those shown in FIG. 2 and will not be explained herein repeatedly.

The voice-duration detecting unit 202 according to the fourth embodiment differs from the voice-duration detecting unit 202 according to the first embodiment in that the reliability representing a likelihood that a sound in each frame is a human voice.

As the reliability, the likelihood of an intensity of a volume or a frame feature amount relative to a voice statistical model calculated from a large amount of speech data. To calculate the likelihood of the frame feature amount, any one of conventional methods used for the voice-duration detection technique such as a method of calculating the likelihood of a voice model based on a multiple mixed normal distribution.

The processing-content determining unit 205 according to the fourth embodiment differs from the processing-content determining unit 205 according to the first embodiment in that the start and end of the processing duration are adjusted using the reliability calculated by the voice-duration detecting unit 202.

Figure 14:
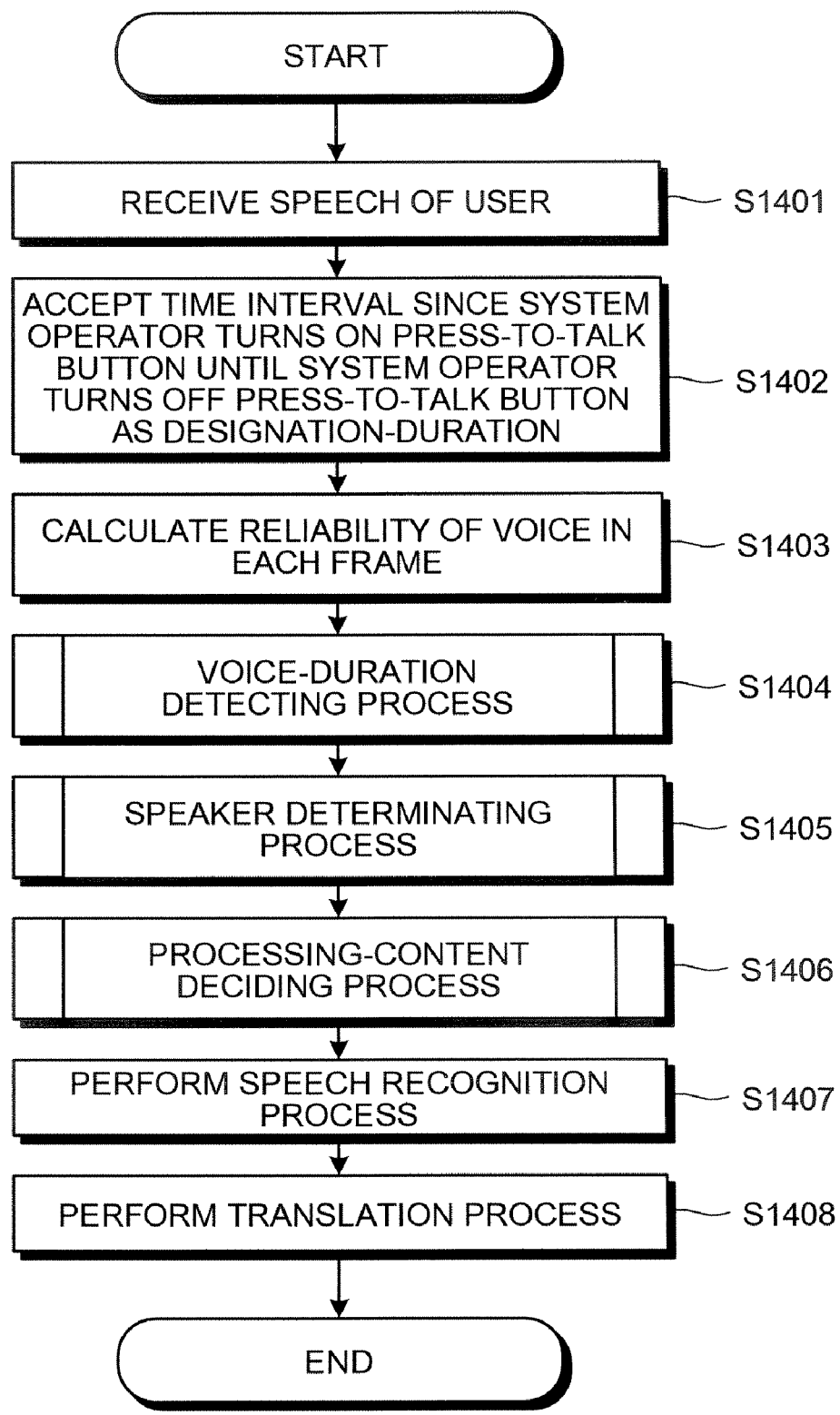
FIG. 14 is a flowchart of a speech processing according to a fourth embodiment.

An overall flow of the speech processing according to the fourth embodiment will be explained with reference to FIG. 14. FIG. 14 is a flowchart of the overall flow of the speech processing according to the fourth embodiment.

The input receiving processing and the designation-duration acceptance processing from steps S1401 to S1402 are the same as those from the steps S301 to S302 for the speech processing apparatus 100 according to the first embodiment. The processings will not be, therefore, explained herein.

After the designation-duration acceptance processing, the voice-duration detecting unit 202 calculates the reliability of the sound in each frame (step S1403). At the time of calculation, the intensity of the volume or the likelihood of the frame feature amount is calculated as the reliability of the sound in each frame. The calculated reliability is stored in the storage region (not shown) so as to be referred to for the subsequent processing-content determining processing.

The voice-duration detection processing and the speaker determination processing from steps S1404 to S1405 and the speech processing from steps S1407 to S1408 are the same as those from the steps S303 to S304 and from the steps S306 to S307 for the speech processing apparatus 100 according to the first embodiment. The processings will not be, therefore, explained herein.

In the fourth embodiment, a content of the processing-content determining processing at a step S1406 differs from that according to the first embodiment. The processing-content determining processing at the step S1406 will be explained in detail.

Figure 15:
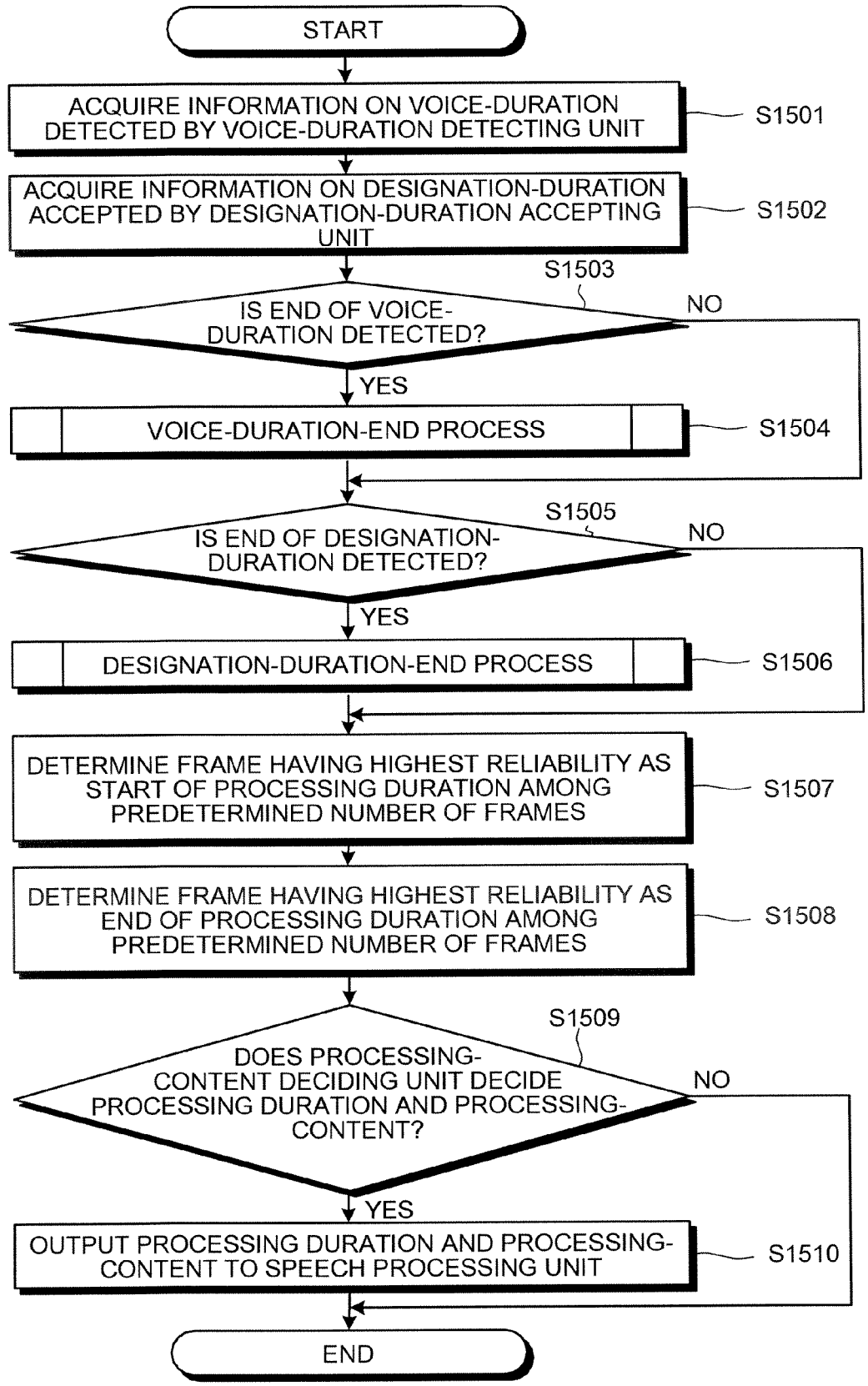
FIG. 15 is a flowchart of a processing-content determination processing according to the fourth embodiment.

FIG. 15 is a flowchart of an overall flow of the processing-content determining processing according to the fourth embodiment.

The voice-duration information acquisition processing, the voice-duration-end processing, and the designation-duration-end processing from steps S1501 to S1506 are the same as those from the steps S701 to S706 for the speech processing apparatus 100 according to the first embodiment. The processings will not be, therefore, explained herein.

After performing the voice-duration-end processing or the designation-duration-end processing, the processing-content determining unit 205 decides a frame having the highest reliability calculated at the step S1403 as the start of the processing duration among a preset number of (hereinafter, "n") before and after frames (step S1507).

It is assumed that the start of the processing duration is 20th frame after activation of the speech processing apparatus 100. If n is three (n=3), the processing-content determining unit 205 acquires reliabilities of frames from a 17th (=20−3) frame to a 23rd (=20+3) frame from the storage region. If the reliability of the 22nd frame is the highest, the processing-content determining unit 205 decides the 22nd frame as the start of the processing duration.

The processing-content determining unit 205 then decides a frame having the highest reliability as the end of the processing duration among a preset number of before and after frames (step S1508).

The determination processing and the output processing from steps S1509 to S1510 are the same as those from the steps S707 to S708 for the speech processing apparatus 100 according to the first embodiment. The processings will not be, therefore, explained herein.

Alternatively, the preset value n can be changed according to whether the speaker is the system operator 101 or the counterpart 102. By doing so, it is possible to correct possible error generated when the starts and ends of voice-durations of different speakers are detected, and detect an appropriate processing duration.

Moreover, by performing the above processing, even if a timing of the start of the voice-duration is offset from that of system operator's start of designation of the processing duration, it is possible to detect the appropriate processing duration.

In this manner, the speech processing apparatus according to the fourth embodiment can calculate the reliability of the detected voice-duration and adjust the start and end of the processing duration according to the reliability. It is, therefore, possible to reduce occurrence of malfunction due to erroneous setting of the processing duration.

A speech processing apparatus according to a fifth embodiment receives the voice using a microphone array constituted by a plurality of microphones, detects the direction of the sound source with high accuracy, emphasizes the voice in the direction of the sound source, and performs the speech processing with high accuracy.

Figure 16:
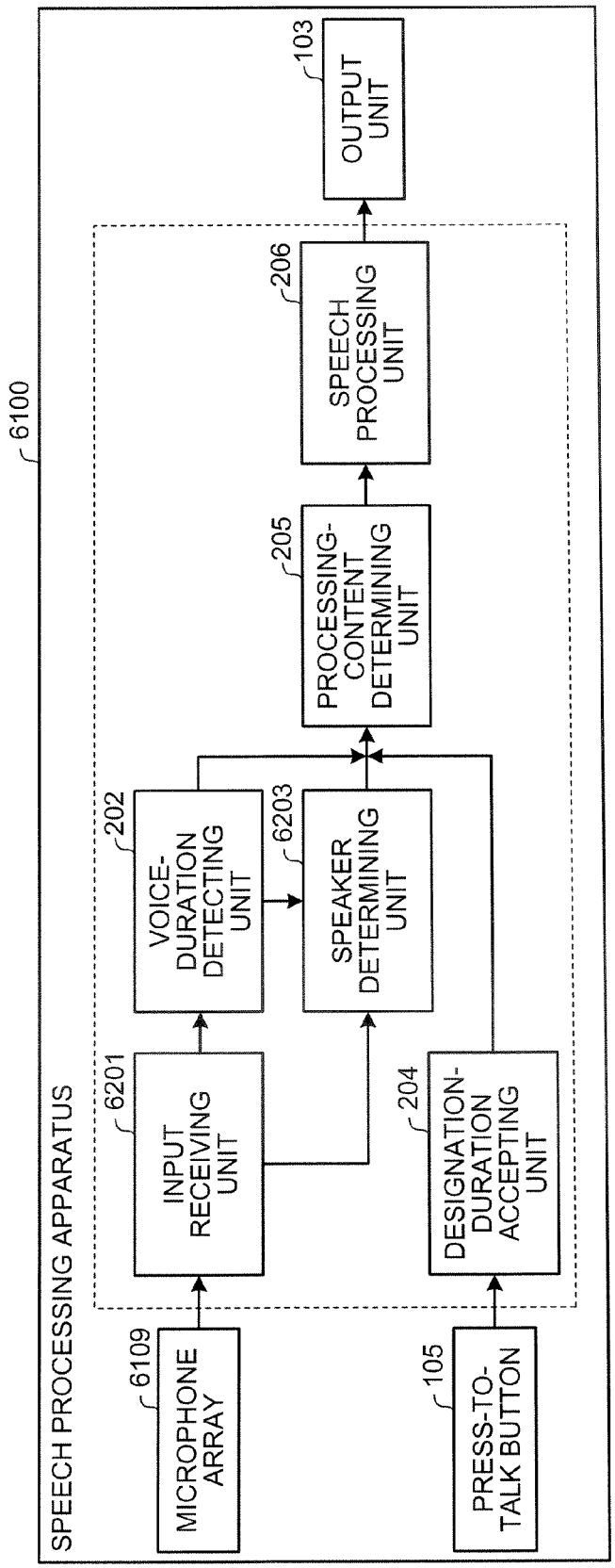
FIG. 16 is a block diagram of a speech processing apparatus according to a fifth embodiment.

FIG. 16 is a block diagram of a configuration of a speech processing apparatus 6100 according to the fifth embodiment. The speech processing apparatus 6100 includes the output unit 103, a microphone array 6109, the press-to-talk button 105, a input receiving unit 6201, the voice-duration detecting unit 202, a speaker determining unit 6203, the designation-duration accepting unit 204, the processing-content determining unit 205, and the speech processing unit 206.

The fifth embodiment differs from the first embodiment in that the microphone array 6109 is provided in place of the microphones 104a and 104b and functions of the input receiving unit 6201 and the speaker determining unit 6203. The other constituent elements and functions of the speech processing apparatus 6100 are the same as those of the speech processing apparatus 100 according to the first embodiment shown in FIG. 2. Therefore, the same constituent elements are denoted by the same reference symbols as those shown in FIG. 2 and will not be explained herein repeatedly. The microphone array 6109 receives the voice from a plurality of microphones and estimates the direction of the sound source of the voice using a difference in time of arrival of the voice from the sound source to each microphone or a difference in sound pressure. Furthermore, the microphone array 6109 can emphasize or suppress the voice in the specified direction by a signal processing. As the microphone array 6109, a microphone array of any one of conventional types can be employed.

The input receiving unit 6201 converts analog voice signals output from the microphone array 6109 into digital signals, and outputs the digital signals to the voice-duration detecting unit 202 and the speaker determining unit 6203.

The speaker determining unit 6203 specifies the direction of the sound source from a time difference in arrival of the voice to a plurality of microphones of the microphone array 6109, and determines the speaker present in the specified direction of the sound source as the corresponding speaker.

The speaker determining unit 6203 outputs the digital voice signal of the emphasized voice in the specified sound direction. It is thereby possible to detect the voice-duration with high accuracy using the signal of the emphasized voice. Moreover, because the speech recognition and the like can be performed on the emphasized voice, the accuracy for the speech processing can be improved.

Figure 17:
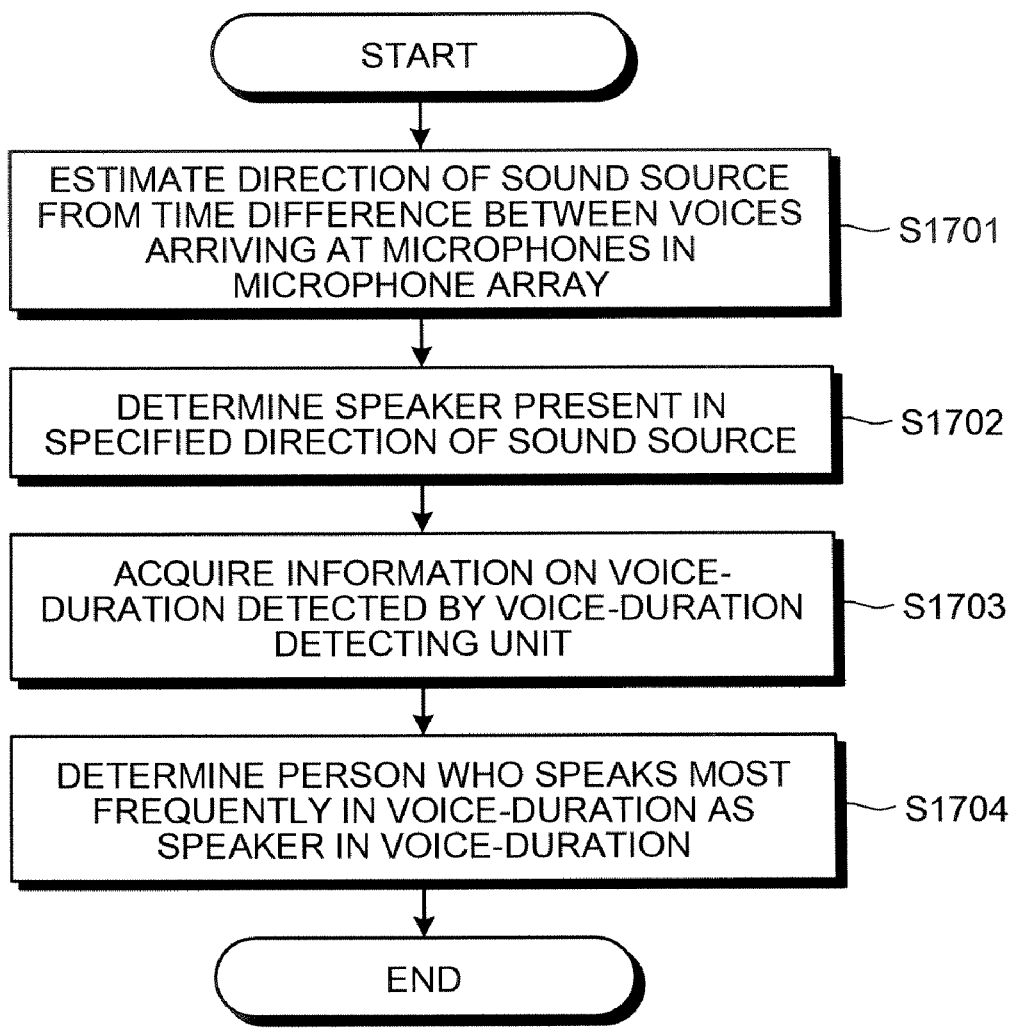
FIG. 17 is a flowchart of a speaker determination processing according to the fifth embodiment.

Next, the speaker determination processing according to the fifth embodiment will be explained in detail. FIG. 17 is a flowchart of an overall flow of the speaker determination processing according to the fifth embodiment.

First, the speaker determining unit 6203 estimates the direction of the sound source using the difference in time of arrival of the voice from the sound source to each of the microphones by the conventional technique such as the method using the cross-correlation (S1701).

The speaker determining unit 6203 specifies the speaker present in the specified direction of the sound source (step S1702).

The voice-duration information acquisition processing and the speaker determination processing from steps S1703 to S1704 are the same as those from the steps S603 to S604 for the speech processing apparatus 100 according to the first embodiment. The processings will not be, therefore, explained herein.

Similarly to the third embodiment, when the designation-duration is designated, the estimated direction of the sound source can be fixed to the direction of the previous sound source without performing the speaker determination processing, i.e., the sound-source-direction estimation processing. In this case, the voice in the fixed direction is emphasized and gathered, and the emphasized voice is subjected to the speech processing by the speech processing unit 206.

In this manner, the speech processing apparatus according to the fifth embodiment can receive the voice using the microphone array constituted by a plurality of microphones, detect the direction of the sound source with high accuracy, emphasize the voice in the direction of the sound source, and perform the voice-duration detection processing and the speech processing with high accuracy.

The present invention is not limited to the first to fifth embodiments. The present invention can be appropriately modified or changed within the scope of the invention. For example, the following modifications can be made.

In the first to fifth embodiments, if the voice of the counterpart 102 is detected, the system operator designates the designation-duration, and the overlapping period between the voice-duration and the designation-duration is present, the voice-duration is decided as the processing duration (step S804). However, the following disadvantage may occur. If the designation-duration is designated even for a moment during the voice of the counterpart 102, the designation-duration is decided as the processing duration.

To prevent the disadvantage, it may be configure that if a length of the duration that is the voice-duration and the designation-duration is smaller than a predetermined length, the voice-duration is not decided as the processing duration. Alternatively, a length of the designation-duration in the voice-duration is smaller than a predetermined ratio of the designation-duration to the voice-duration, the voice-duration is not decided as the processing duration.

By so configuring, if the system operator 101 depresses the press-to-talk button 105 to translate the voice of the counterpart 102 but stops the speech translation processing soon after or if the designation-duration is designated due to the operation error, the decision of the processing duration can be avoided by instantly finishing designation of the designation-duration (turning off the press-to-talk button 105).

In the first to fifth embodiments, if the start and end of the voice-duration of the system operator are detected while the designation-duration is designated, then the determination of the processing duration is suspended until the end of the designation-duration is detected, and the processing duration and the processing-content are not decided (step S805: NO).

Therefore, the speech processing apparatus can be configured to measure passing time since the end of the voice-duration of the system operator is detected, and to determine that the end of the designation-duration is detected and forcibly decides the processing duration and the processing-content when the passing time becomes equal to or longer than a preset value.

By doing so, it is possible to avoid deciding the processing duration to delay the speech processing and obstructing smooth conversation such as for instance in which the system operator 101 fails to finish designating the designation-duration. Moreover, because of a long time interval between two voices, it is more natural to determine that the two voices are different from each other than to determine that the two voices constitute one sentence. In this case, it is possible to divide the voice into two voices and, therefore, possible to realize a response with shorter waiting time.

In the first to fifth embodiments, when the system operator 101 designates the designation-duration by depressing the press-to-talk button 105, it is determined that the duration of the voice in which the press-to-talk button 105 is in the ON-state is the designation-duration.

Alternatively, when the ON/OFF operations of the press-to-talk button 105 are considered as one operation such as clicking on the press-to-talk button 105, the speech processing apparatus can be configured to switch over designation of the start and end of the designation-duration for every operation of the press-to-talk button 105. Namely, if the start of the designation-duration is not input, the designation of the designation-duration is started by clicking on the press-to-talk button 105. When the system operator 101 clicks on the press-to-talk button 105 next time, the designation of the designation-duration is finished.

Moreover, while the start of the designation-duration is determined whether the press-to-talk button 105 is clicked on, the speech processing apparatus can be configured to dispense with designation of the end of the designation-duration and to decide the end of the voice-duration as the end of the designation-duration. By doing so, if the speaker is the counterpart 102, the voice-duration can be decided as the processing duration. If the speaker is the system operator 101, a part of the voice-duration after clicking can be decided as the processing duration.

With the configuration, the advantage in that the system operator 101 can decide a duration of a desired part of the voice as the processing duration is lost. However, the system operator 101 can exclude the unnecessary voice-duration such as that of the start of the voice-duration. It is, therefore, possible to exhibit the advantage in that an appropriate processing duration can be decided according to the speaker.

In the first to fifth embodiments, the sound information corresponding to the processing duration is extracted, the sound information is subjected to the speech recognition by combining a plurality of processing durations in order of time, and the speech recognition result is translated. The reason is as follows. It is expected to improve the accuracy for the speech recognition processing if the speech recognition processing is performed on the sound while combining the processing durations.

As another method, the speech processing apparatus can be configured as follows. The speech recognition processing is performed on all the voice-durations overlapping with the processing duration, and only the speech recognition result of the part corresponding to the processing duration is output and translated. By doing so, the voice in a longer duration can be subjected to the speech recognition processing. Therefore, it is possible to improve the accuracy for the speech recognition using context information.

As still another method, the speech processing apparatus can be configured as follows. If the processing duration is divided into a plurality of processing durations, the speech recognition is performed on the speech in each of the divided processing durations and the speech recognition result is translated without combining the divided processing durations in order of time.

Figure 18:
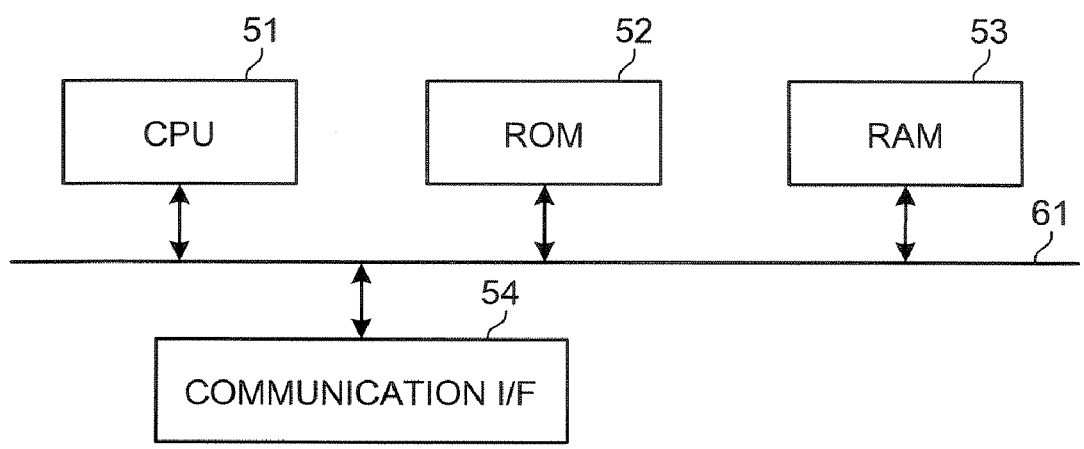
FIG. 18 is an explanatory view of a hardware constitution of each of the speech processing apparatuses according to the first to fifth embodiments.

FIG. 18 is a hardware block diagram of each of the speech processing apparatuses according to the first to fifth embodiments.

The speech processing apparatus according to each of the first to fifth embodiments include a control device such as a central processing unit (CPU) 51, storage devices such as a read-only memory (ROM) 52 and a random-access memory (RAM) 53, a communication interface (I/F) 54 for connecting to a network to hold communication, and a bus 61 connecting the respective constituent elements.

A speech processing program executed by the speech processing apparatus according to each of the first to fifth embodiments is provided by being incorporated into the ROM 52 or the like in advance.

The speech processing program executed by the speech processing apparatus according to each of the first to fifth embodiments can be configured to be provided by being recorded in a computer-readable recording medium such as a compact disk read-only memory (CD-ROM), a flexible disk (FD), a compact disk recordable (CD-R) or a digital versatile disk (DVD) in an installable or executable format.

Moreover, the speech processing program executed by the speech processing apparatus according to each of the first to fifth embodiments can be configured to be provided by being stored in a computer connected to such a network as the Internet and downloaded via the network. Furthermore, the speech processing program executed by the speech processing apparatus according to each of the first to fifth embodiments can be constituted to be provided or distributed via such a network as the Internet.

The speech processing program executed by the speech processing apparatus according to each of the first to fifth embodiments is configured by a module including the units (input receiving unit, the voice-duration detecting unit, the speaker determining unit, the designation-duration accepting unit, the processing-content determining unit, and the speech processing unit). As actual hardware, the CPU 51 reads the speech processing program from the ROM 52 and executes the speech processing program. As a result, the respective units are loaded on a main memory device (not shown) and created on the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech processing apparatus comprising:
a sound input unit that receives an input of a sound including a voice of one of an operator and a person other than the operator;

a designation-duration accepting unit that accepts a designation-duration designated by the operator as a time interval that is a target of a speech processing within the input sound;

a voice-duration detecting unit that detects a voice-duration that is a time interval in which the voice is present from the input sound;

a speaker determining unit that determines whether a speaker of the voice is the operator or the person other than the operator based on the input sound; and a deciding unit that detects an overlapping period between the accepted designation-duration and the detected voice-duration, and decides that the voice-duration including the overlapping period is a processing duration, when the overlapping period is detected and the speaker is determined to be the person other than the operator by the speaker determining unit.

2. The apparatus according to claim 1, wherein the deciding unit decides that the overlapping period is the processing duration, when the overlapping period is detected and the speaker is determined to be the operator by the speaker determining unit.

3. The apparatus according to claim 1, further comprising:
a speech processing unit that performs a speech processing on the sound in the processing duration decided by the deciding unit, wherein
the deciding unit further decides a processing-content of the speech processing to the sound based on the speaker determined by the speaker determining unit, and
the speech processing unit performs the speech processing to the sound in the processing duration with the processing-content decided by the deciding unit.

4. The apparatus according to claim 3, wherein the deciding unit changes information used for a speech recognition processing and including at least one of an acoustic model, a vocabulary, and a grammar according to the speaker being the operator or the person other than the operator, and decides that the speech recognition processing is performed by the changed information as the processing-content.

5. The apparatus according to claim 3, wherein the determining unit changes information used for a translation processing and including at least one of a translation source language, a translation target language, and a translation method according to the speaker being the operator or the person other than the operator, and decides that the translation processing is performed by the changed information as the processing-content.

6. The apparatus according to claim 3, wherein the speech processing unit performs the speech processing on the sound in the voice-duration detected by the voice-duration detecting unit, and outputs a part of a speech processing result corresponding to the processing duration determined by the deciding unit within the whole speech processing result.

7. The apparatus according to claim 3, wherein
when the voice-duration detecting unit detects a plurality of voice-durations in the designation-duration accepted by the designation-duration accepting unit and the deciding unit decides that the plurality of voice-durations are the processing duration, the speech processing unit combines the plurality of processing durations and performs the speech processing on the sound in the combined processing durations.

8. The apparatus according to claim 1, wherein
when the accepted designation-duration is shorter than a predetermined period, the deciding unit decides the processing duration as that the designation-duration accepting unit does not accept the designation-duration.

9. The apparatus according to claim 1, wherein
when a ratio of the designation-duration accepted by the designation-duration accepting unit to the detected voice-duration is lower than a predetermined threshold, the deciding unit decides the processing duration as that the designation-duration accepting unit does not accept the designation-duration.

10. The apparatus according to claim 1, wherein the designation-duration accepting unit accepts a period while an operation button is being depressed as the designation-duration.

11. The apparatus according to claim 1, wherein the designation-duration accepting unit accepts a period from a depression of an operation button to next depression of the operation button as the designation-duration.

12. The apparatus according to claim 1, wherein
when a predetermined period passes since a start of a depression of an operation button is depressed, the designation-duration accepting unit accepts a duration from the start of the depression of the operation button until the passage of the predetermined period as the designation-duration.

13. The apparatus according to claim 1, further comprising:
an imaging unit that picks up an image of a face of the operator or a face of the person other than the operator; and
a recognizing unit that recognizes the image of the face picked up by the imaging unit so as to acquire face image information including a direction and an expression of the face, wherein
the designation-duration accepting unit accepts a start and an end of the designation-durations based on a change in the acquired face image information.

14. The apparatus according to claim 1, wherein the speaker determining unit does not determine the speaker, when the speaker is already determined during a designation within the designation-duration.

15. The apparatus according to claim 1, wherein the voice-duration detecting unit further calculates a reliability representing a likelihood of the detected voice-duration, and
the deciding unit changes a start or an end of the voice-duration into the start or the end of the voice-duration in which the calculated reliability is maximum, the reliability being calculated for the voice-duration in a predetermined range of at least one of before and after the start or the end of the voice-duration.

16. The apparatus according to claim 1, wherein
the sound input unit receives the sound through a microphone array including a plurality of microphones, and
the speaker determining unit determines whether the speaker of the voice is the operator or the person other than the operator based on the sound input to the plurality of microphones.

17. A speech processing method comprising:
inputting a sound including a voice of one of an operator and a person other than the operator;
accepting an input of a designation-duration designated by the operator as a time interval that is a target of a speech processing within the input sound;
detecting a voice-duration that is a time interval in which the voice is present from the input sound;
determining whether a speaker of the voice is the operator or the person other than the operator based on the input sound;
detecting an overlapping period between the received designation-duration and the detected voice-duration; and deciding that the voice-duration including the overlapping period is a processing duration, when the overlapping period is detected and the speaker is determined to be the person other than the operator.

18. A computer program product having a computer readable medium including programmed instructions for speech processing, wherein the instructions, when executed by a computer, cause the computer to perform:

inputting a sound including a voice of one of an operator and a person other than the operator;

accepting an input of a designation-duration designated by the operator as a time interval that is a target of a speech processing within the input sound;

detecting a voice-duration that is a time interval in which the voice is present from the input sound;

determining whether a speaker of the voice is the operator or the person other than the operator based on the input sound;

detecting an overlapping period between the received designation-duration and the detected voice-duration; and deciding that the voice-duration including the overlapping period is a processing duration, when the overlapping period is detected and the speaker is determined to be the person other than the operator.

\* \* \* \* \*